US012671935B2

(12) United States Patent
Lee

(10) Patent No.: US 12,671,935 B2
(45) Date of Patent: Jun. 30, 2026

(54) DISPLAY APPARATUS COMPRISING BOTH COIL TYPE AND PIEZOELECTRIC SPEAKERS

(71) Applicant: LG Display Co., Ltd., Seoul (KR)

(72) Inventor: Sungtae Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 355 days.

(21) Appl. No.: 18/239,974

(22) Filed: Aug. 30, 2023

(65) Prior Publication Data

US 2024/0080611 A1 Mar. 7, 2024

(30) Foreign Application Priority Data

Sep. 5, 2022 (KR) ........................ 10-2022-0112326

(51) Int. Cl.
*H04R 1/28* (2006.01)
*H04R 1/02* (2006.01)
*H04R 17/00* (2006.01)

(52) U.S. Cl.
CPC ........... *H04R 1/2807* (2013.01); *H04R 1/025* (2013.01); *H04R 1/028* (2013.01); *H04R 17/005* (2013.01)

(58) Field of Classification Search
CPC . H04R 1/025; H04R 1/06; H04R 1/24; H04R 1/26; H04R 1/2807; H04R 3/12; H04R 7/06; H04R 9/045; H04R 2400/11; H04R 2499/15
See application file for complete search history.

(56) References Cited

U.S. PATENT DOCUMENTS

| | | | | |
|---|---|---|---|---|
| 6,385,328 | B1 * | 5/2002 | Yoo | H04R 1/06 381/409 |
| 7,804,976 | B1 * | 9/2010 | Parham | H04R 9/022 381/396 |
| 8,682,020 | B2 | 3/2014 | Wilk et al. | |
| 10,754,372 | B2 | 8/2020 | Lee et al. | |
| 10,915,138 | B2 | 2/2021 | Lee et al. | |
| 11,039,235 | B2 | 6/2021 | Im et al. | |
| 11,490,182 | B2 * | 11/2022 | Ahn | G06F 3/044 |
| 11,582,543 | B2 | 2/2023 | Im et al. | |
| 11,592,863 | B2 | 2/2023 | Lee et al. | |
| 11,984,241 | B2 | 5/2024 | Ko et al. | |

(Continued)

FOREIGN PATENT DOCUMENTS

| | | |
|---|---|---|
| EP | 3627849 A1 | 3/2020 |
| JP | H09-37370 A | 2/1997 |

(Continued)

OTHER PUBLICATIONS

The Japan Patent Office, Office Action, Japanese Patent Application No. 2023-142858, Nov. 13, 2024, 13 pages.

(Continued)

*Primary Examiner* — Fan S Tsang
*Assistant Examiner* — Sean M Rinehart
(74) *Attorney, Agent, or Firm* — Fenwick & West LLP

(57) ABSTRACT

An apparatus includes a vibration member, a supporting member on a rear surface of the vibration member, a first vibration apparatus connected with the rear surface of the vibration member, and a second vibration apparatus between the vibration member and the supporting member to overlap the first vibration apparatus.

32 Claims, 10 Drawing Sheets

(56) References Cited

U.S. PATENT DOCUMENTS

| | | | | |
|---|---|---|---|---|
| 2013/0077816 | A1* | 3/2013 | Her | H04R 9/025 381/412 |
| 2013/0089231 | A1 | 4/2013 | Wilk et al. | |
| 2019/0018448 | A1 | 1/2019 | Lee et al. | |
| 2019/0050024 | A1* | 2/2019 | Ahn | G06F 1/1626 |
| 2019/0182586 | A1* | 6/2019 | Kim | H04R 7/12 |
| 2019/0259362 | A1* | 8/2019 | Kim | B06B 1/045 |
| 2020/0296496 | A1* | 9/2020 | Im | H04R 9/045 |
| 2020/0314556 | A1* | 10/2020 | Lee | H04R 17/005 |
| 2020/0333831 | A1 | 10/2020 | Lee et al. | |
| 2020/0404808 | A1* | 12/2020 | Kim | H04R 9/022 |
| 2021/0004198 | A1 | 1/2021 | Ha et al. | |
| 2021/0149440 | A1 | 5/2021 | Lee et al. | |
| 2021/0297761 | A1 | 9/2021 | Im et al. | |
| 2021/0304920 | A1 | 9/2021 | Ko et al. | |
| 2021/0392439 | A1 | 12/2021 | Ye | |
| 2022/0182744 | A1 | 6/2022 | Han et al. | |
| 2023/0199354 | A1 | 6/2023 | Kim et al. | |

FOREIGN PATENT DOCUMENTS

| | | | |
|---|---|---|---|
| JP | 2004-056544 | A | 2/2004 |
| JP | 2013-085253 | A | 5/2013 |
| JP | 2020-150534 | A | 9/2020 |
| JP | 2021-163765 | A | 10/2021 |
| KR | 10-2019-0007347 | A | 1/2019 |
| KR | 10-2023-0094707 | A | 6/2023 |

OTHER PUBLICATIONS

European Patent Office, Partial Search Report, European Patent Application No. 23194537.9, Jan. 26, 2024, 17 pages.

European Patent Office, Extended European Search Report, European Patent Application No. 23194537.9, Apr. 22, 2024, 19 pages.

* cited by examiner

DISPLAY APPARATUS COMPRISING BOTH COIL TYPE AND PIEZOELECTRIC SPEAKERS

CROSS-REFERENCE TO RELATED APPLICATION

This application claims the benefit of the Republic of Korea Patent Application No. 10-2022-0112326 filed on Sep. 5, 2022, which is hereby incorporated by reference in its entirety.

BACKGROUND

Field of Technology

The present disclosure relates to an apparatus.

Discussion of the Related Art

Apparatus include a separate speaker or sound apparatus, for providing a sound. When a speaker is provided in an apparatus, a problem occurs where the design and space arrangement of the apparatus are limited due to a space occupied by the speaker.

However, because a sound output from the speaker of the display apparatus may travel to a rearward or a downward direction of the display apparatus, sound quality may be degraded due to interference between sound reflected from a wall and the ground. For this reason, it may be difficult to transfer an accurate sound, and the immersion experience of a viewer is reduced.

SUMMARY

Therefore, the inventors have recognized the problems described above and have performed various experiments for enhancing a sound characteristic and/or a sound pressure level characteristic of an apparatus or a sound apparatus. Based on the various experiments, the inventors have invented an apparatus which may enhance the quality of a sound and a sound pressure level characteristic.

An aspect of the present disclosure is directed to providing an apparatus which may vibrate a vibration member to generate a vibration or a sound and may enhance a sound characteristic and/or a sound pressure level characteristic.

Another aspect of the present disclosure is directed to providing an apparatus which may vibrate a vibration member to generate a vibration or a sound and may enhance a sound characteristic and/or a sound pressure level characteristic of a broad pitched sound band.

Another aspect of the present disclosure is directed to providing an apparatus which may efficiently dissipate heat occurring due to a vibration apparatus.

The objects of the present disclosure are not limited to the aforesaid, but other objects not described herein will be clearly understood by those skilled in the art from descriptions below.

In one embodiment, an apparatus comprises: a vibration member; a supporting member on a rear surface of the vibration member; a first vibration apparatus connected with the rear surface of the vibration member and between the supporting member and the vibration member, the first vibration apparatus configured to vibrate such that the vibration member vibrates; and a second vibration apparatus between the first vibration apparatus and the supporting member and the second vibration apparatus overlapping the first vibration apparatus, the second vibration apparatus configured to vibrate such that the vibration member vibrates.

In one embodiment, a display apparatus comprises: a display panel including a front surface and a rear surface that is opposite the front surface; a first type of vibration apparatus on the rear surface of the display panel, the first type of vibration apparatus configured to vibrate; and a second type of vibration apparatus that is different from the first type of vibration apparatus and overlapping the first type of vibration apparatus such that the first type of vibration apparatus is between the display panel and the second type of vibration apparatus, the second type of vibration apparatus configured to vibrate, wherein the display panel is configured to emit sound or vibrate responsive to the first type of vibration apparatus vibrating or the second type of vibration apparatus vibrating.

Details of other embodiments are included in the detailed description and the drawings.

The effects of the present disclosure are not limited to the aforesaid, but other effects not described herein will be clearly understood by those skilled in the art from descriptions below.

The details of the present disclosure described in technical problem, technical solution, and advantageous effects do not specify essential features of claims, and thus, the scope of claims is not limited by the details described in detailed description of the invention.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
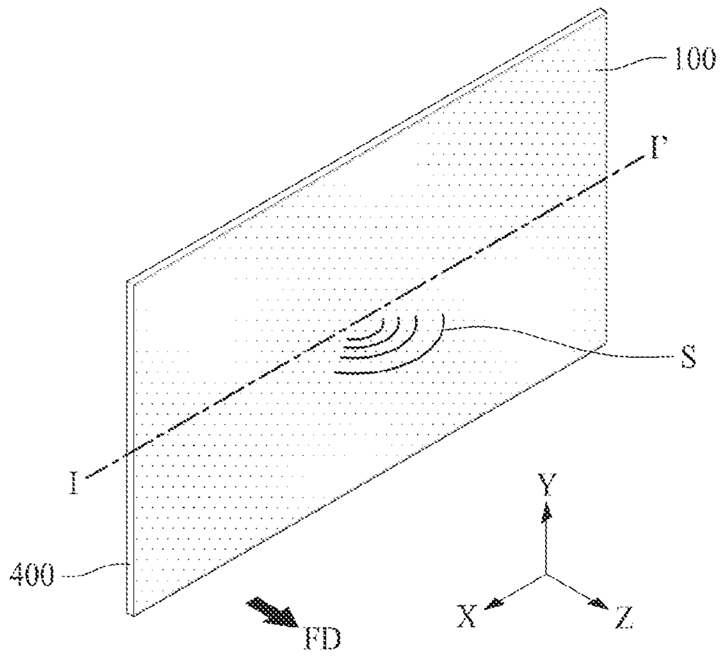
FIG. 1 illustrates an apparatus according to an embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first", "second", etc. may be used herein to describe various elements, these elements should not be limited by these terms. These terms are only used to partition one element from another. For example, a first element could be termed a second element, and, similarly, a second element could be termed a first element, without departing from the scope of the present invention.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the present disclosure, examples of an apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the apparatus may include a narrow-sense display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic apparatus which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set apparatus may further include a set PCB which is a set controller electrically connected to the source PCB to overall control the set apparatus.

A display panel applied to the present embodiment may use all types of display panels such as a liquid crystal display panel, an organic light emitting diode (OLED) display panel, and an electroluminescent display panel, but embodiments of the present disclosure are not limited to a specific display panel, which is vibrated by a sound generation device according to the present embodiment to output a sound. Also, a shape or a size of a display panel applied to a display apparatus according to the present embodiment is not limited.

For example, when the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, when the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed at the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another embodiment of the present disclosure, the layer provided on the array substrate may include a micro light emitting diode.

The display panel may further include a backing such as a metal plate attached on the display panel. However, the present embodiment is not limited to the metal plate, and the display panel may include another structure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

Figure 2:
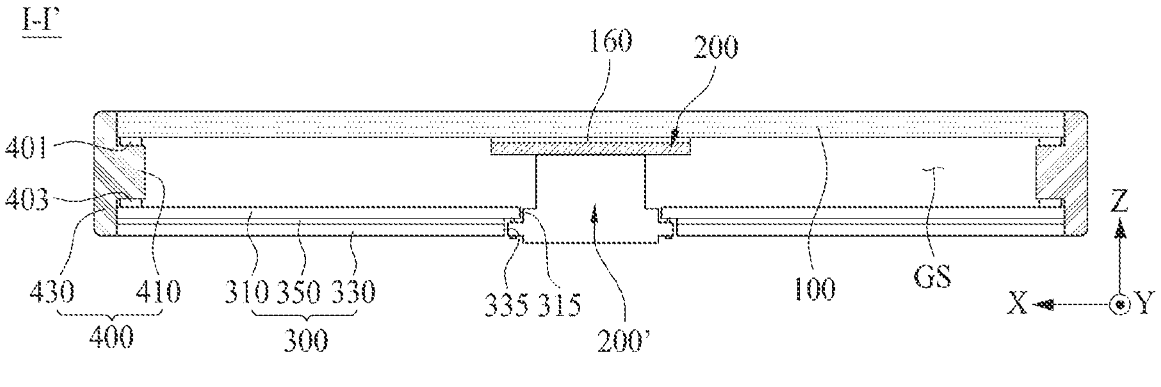
FIG. 2 is a cross-sectional view taken along line I-f illustrated in FIG. 1 according to an embodiment of the present disclosure.

FIG. 1 illustrates an apparatus according to an embodiment of the present disclosure, and FIG. 2 is a cross-sectional view taken along line I-I' illustrated in FIG. 1 according to an embodiment of the present disclosure.

With reference to FIGS. 1 and 2, the apparatus (e.g., a display apparatus) according to an embodiment of the present disclosure may include a vibration member 100 and a vibration apparatus 200 and 200' disposed at a rear surface (or a backside) of the vibration member 100. For example, the vibration member 100 may be a vibration object, a display panel, a vibration plate, or a front member, but embodiments of the present disclosure are not limited thereto. Hereinafter, an example where a vibration member is a display panel will be described.

The vibration member 100 according to an embodiment of the present disclosure may be a display panel that is configured to display an image. The display panel may display an electronic image, a digital image, a still image or a video image. For example, the display panel may output light to display an image. The display panel may be a curved display panel, or may be any type of display panel, such as a liquid crystal display panel, an organic light-emitting display panel, a quantum dot light-emitting display panel, a micro light-emitting diode display panel, and an electrophoresis display panel. The display panel may be a flexible display panel. For example, the display panel may a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto.

The display panel according to an embodiment of the present disclosure may include a display area (or an active area) for displaying an image according to driving of the plurality of pixels. The display panel may include a non-display area (or an inactive area) surrounding the display area, but embodiments of the present disclosure are not limited thereto.

The display panel according to an embodiment of the present disclosure may include an anode electrode, a cathode electrode, and a light emitting device, and may be configured to display an image in a type such as a top emission type, a bottom emission type, or a dual emission type, according to a structure of a pixel array layer including a plurality of pixels. In the top emission type, an image may be displayed by outputting visible light generated from the pixel array layer to the forward region of a base substrate. In the bottom emission type, an image may be displayed by outputting visible light generated from the pixel array layer to the backward region of the base substrate.

The display panel according to an embodiment of the present disclosure may include a pixel array portion disposed at the substrate. The pixel array portion may include a plurality of pixels which display an image based on a signal supplied through the signal lines. The signal lines may include a gate line, a data line and a pixel driving power line, or the like, but embodiments of the present disclosure are not limited thereto.

Each of the plurality of pixels may include a pixel circuit layer including a driving thin film transistor (TFT) provided at the pixel area which is configured by a plurality of gate lines and/or a plurality of data lines, an anode electrode electrically connected to the driving TFT, a light emitting layer formed over the anode electrode, and a cathode electrode electrically connected to the light emitting layer.

The driving TFT may be configured at a transistor region of each pixel area provided at a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but embodiments of the present disclosure are not limited thereto.

The anode electrode may be provided at an opening region provided at each pixel area and may be electrically connected to the driving TFT.

A light emitting device according to an embodiment of the present disclosure may include an organic light emitting device layer formed over an anode electrode. The organic light emitting device layer may be implemented to emit light having the same color (for example, white light) for each pixel, or may be implemented to emit light having a different color (for example, red light, green light, or blue light) for each pixel. A cathode electrode (or a common electrode) may be connected to the organic light emitting device layer provided in each pixel area in common. For example, the organic light emitting device layer may have a stack structure including a single structure or two or more structures including the same color for each pixel. As another embodiment of the present disclosure, the organic light emitting device layer may have a stack structure including two or more structures including one or more different colors for each pixel. The two or more structures including the one or more different colors may be configured with one or more of blue, red, yellow-green, and green or a combination thereof, but embodiments of the present disclosure are not limited thereto. An example of the combination may include blue and red, red and yellow-green, red and green, red/yellow-green/green, or the like, but embodiments of the present disclosure are not limited thereto. Also, regardless of a stack order thereof, the present disclosure may be applied. The stack structure including two or more structures having the same color or one or more different colors may further include a charge generating layer between the two or more structures. The charge generating layer may have a PN junction structure and may include an N-type charge generating layer and a P-type charge generating layer.

According to another embodiment of the present disclosure, the light emitting device may include a micro light emitting diode device electrically connected to each of an anode electrode and a cathode electrode. The micro light emitting diode device may be a light emitting diode implemented as an integrated circuit (IC) or chip type. The micro light emitting diode device may include a first terminal electrically connected to the anode electrode and a second terminal electrically connected to the cathode electrode. The cathode electrode may be connected to the second terminal of the micro light emitting diode device provided in each pixel area in common.

An encapsulation part may be formed on the substrate to surround the pixel array portion, thereby preventing or at least reducing oxygen or water from penetrating into the light emitting device layer of the pixel array portion. The encapsulation part according to an embodiment of the present disclosure may be formed in a multi-layer structure where an organic material layer and an inorganic material layer are alternately stacked, but the term is not limited thereto. The inorganic material layer may prevent oxygen or water from penetrating into the light emitting device layer of the pixel array portion. The organic material layer may be formed to have a thickness which is relatively thicker than the inorganic material layer, so as to cover particles occurring in a manufacturing process. For example, the encapsulation part may include a first inorganic layer, an organic layer on the first inorganic layer, and a second inorganic layer on the organic layer. The organic layer may be a particle cover layer. The touch panel may be disposed at the encapsulation part, or may be disposed at a rear surface of the pixel array portion.

The display panel according to an embodiment of the present disclosure may include a first substrate, a second substrate, and a liquid crystal layer. The first substrate may be an upper substrate or a thin film transistor (TFT) array substrate. For example, the first substrate may include a pixel array (or a display part or a display area) including a plurality of pixels which are respectively provided in a plurality of pixel areas defined by intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The first substrate may further include a pad part provided at a first periphery (or a first non-display part) and a gate driving circuit provided at a second periphery (or a second non-display part).

The pad part may supply a signal, supplied from the outside, to the pixel array and/or the gate driving circuit. For example, the pad part may include a plurality of data pads connected to a plurality of data lines through a plurality of data link lines and/or a plurality of gate input pads connected to the gate driving circuit through a gate control signal line. For example, a size of the first substrate may be greater than the second substrate, but embodiments of the present disclosure are not limited thereto.

The gate driving circuit (or a scan driving circuit) according to an embodiment of the present disclosure may be embedded (or integrated) into a second periphery of the first substrate so as to be connected to the plurality of gate lines. For example, the gate driving circuit may be implemented with a shift register including a transistor, which is formed through the same process as the TFT provided at the pixel area. According to another embodiment of the present disclosure, the gate driving circuit may be implemented as an integrated circuit (IC) and may be provided at a panel driving circuit, without being embedded into the first substrate.

The second substrate may be a lower substrate or a color filter array substrate. For example, the second substrate may include a pixel pattern (or a pixel defining pattern or a black matrix) including an opening area overlapping with the pixel area formed in the first substrate, and a color filter layer formed at the opening area. The second substrate may have a size which is smaller than the first substrate, but embodiments of the present disclosure are not limited thereto. For example, the second substrate may overlap a remaining portion, other than the first periphery, of the upper substrate. The second substrate may be attached to a remaining portion, other than the first periphery, of the first substrate with a liquid crystal layer therebetween using a sealant.

The liquid crystal layer may be disposed between the first substrate and the second substrate. The liquid crystal layer may include a liquid crystal including liquid crystal molecules where an alignment direction thereof is changed based on an electric field generated by the common voltage and a data voltage applied to a pixel electrode for each pixel.

A second polarization member may be attached on a bottom surface of the second substrate and may polarize light which is incident from the backlight and travels to the liquid crystal layer. A first polarization member may be attached on a top surface of the first substrate and may polarize light which passes through the first substrate and is output to the outside.

The display panel according to an embodiment of the present disclosure may drive the liquid crystal layer based on an electric field which is generated in each pixel by the data voltage and the common voltage applied to each pixel, and thus, may display an image based on light passing through the liquid crystal layer.

In display panel according to another embodiment of the present disclosure, the first substrate may be implemented as the color filter array substrate, and the second substrate may be implemented as the TFT array substrate. For example, the display panel according to another embodiment of the present disclosure may have a type where an upper portion and a lower portion of the display panel according to an embodiment of the present disclosure are reversed therebetween. For example, a pad part of the display panel according to another embodiment of the present disclosure may be covered by a separate mechanism or structure.

The display panel according to an embodiment of the present disclosure may include a bending portion that may be bent or curved to have a curved shape or a certain curvature radius.

The bending portion of the display panel may be in at least one or more of one periphery and the other periphery of the display panel, which are parallel to each other. The one periphery and/or the other periphery, where the bending portion is implemented, of the display panel may include only the non-display area, or may include a periphery of the display area and the non-display area. The display panel including the bending portion implemented by bending of the non-display area may have a one-side bezel bending structure or a both-side bezel bending structure. Also, the display panel including the bending portion implemented by bending of the periphery of the display area and the non-display area may have a one-side active bending structure or a both-side active bending structure.

According to another embodiment of the present disclosure, the vibration member 100 may include one or more of metal, wood, rubber, plastic, carbon, glass, cloth, fiber, paper, mirror, and leather, but embodiments of the present disclosure are not limited thereto. For example, the paper may be a cone paper for speakers. For example, the cone paper may be pulp or foam plastic, but embodiments of the present disclosure are not limited thereto.

According to another embodiment of the present disclosure, the vibration member 100 may include one or more of a display panel including a pixel displaying an image, a screen panel on which an image is projected from a display apparatus, a lighting panel, a signage panel, a vehicular (or car or automotive) interior material, a vehicular glass window, a vehicular exterior material, a ceiling material of a building, an interior material of a building, a glass window of a building, and mirror, but embodiments of the present disclosure are not limited thereto. For example, the display panel may be a curved display panel or all types of display panels such as a liquid crystal display panel, an organic light emitting display panel, a quantum dot light emitting display panel, a micro light emitting diode display panel, and an electrophoresis display panel. For example, the display panel may be a flexible display panel. For example, the flexible display panel may be a flexible light emitting display panel, a flexible electrophoresis display panel, a flexible electro-wetting display panel, a flexible micro light emitting diode display panel, or a flexible quantum dot light emitting display panel, but embodiments of the present disclosure are not limited thereto. For example, a lighting panel (or a non-display panel) may be a light emitting diode lighting panel (or apparatus), an organic light emitting diode lighting panel (or apparatus), or an inorganic light emitting diode lighting panel (or apparatus), but embodiments of the present disclosure are not limited thereto.

The vibration apparatuses 200 and 200' may vibrate the vibration member 100. For example, the vibration apparatuses 200 and 200' may directly or indirectly vibrate the vibration member 100. The vibration apparatuses include a first vibration apparatus 200 and a second vibration apparatus 200'. For example, the vibration apparatuses 200 and 200' may be implemented at a rear surface of the vibration member 100. For example, the vibration apparatuses 200 and 200' may vibrate the vibration member 100 at the rear surface of the vibration member 100, and thus, may provide a user with a sound S and/or a haptic feedback, based on a vibration of the vibration member 100. For example, the vibration member 100 may output the sound S, based on vibrations of the vibration apparatuses 200 and 200'. The vibration apparatuses 200 and 200' may output the sound S by using the vibration member 100 as a vibration plate. For example, the vibration apparatuses 200 and 200' may output the sound S in a forward (or front) direction FD of the vibration member 100 by using the vibration member 100 as a vibration plate. For example, the vibration apparatuses 200 and 200' may generate the sound S so that the sound travels in a forward (or front) direction FD of the display panel or the vibration member 100. The vibration apparatuses 200 and 200' may vibrate the vibration member 100 to output the sound S. For example, the vibration apparatuses 200 and 200' may directly vibrate the vibration member 100 to output the sound S in the forward (or front) direction FD of the apparatus. The vibration apparatuses 200 and 200' may indirectly vibrate the vibration member 100 to output the sound S.

According to an embodiment of the present disclosure, the vibration apparatuses 200 and 200' may vibrate based on a vibration driving signal synchronized with an image displayed by the display panel corresponding to the vibration member 100 to vibrate the display panel. According to another embodiment of the present disclosure, the vibration apparatuses 200 and 200' may vibrate based on a haptic feedback signal (or a tactile feedback signal) synchronized with a user touch applied to a touch panel (or a touch sensor layer) disposed in or embedded into the display panel to vibrate the display panel. Accordingly, the display panel may vibrate based on vibrations of the vibration apparatuses 200 and 200' to provide a user (or a viewer) with at least one of the sound S and the haptic feedback.

The vibration apparatuses 200 and 200' according to an embodiment of the present disclosure may include the first vibration apparatus 200 and the second vibration apparatus 200'. For example, the first vibration apparatus 200 may be connected with the rear surface of the display panel or the vibration member 100. The second vibration apparatus 200' may be between the vibration member 100 or the display panel and the supporting member 300 and may overlap the first vibration apparatus 200. Thus, the first vibration apparatus 200 is between the vibration member 100 and the vibration apparatus 200'.

The first vibration apparatus 200 according to an embodiment of the present disclosure may be implemented as a piezoelectric type vibration apparatus (e.g., a first type of vibration apparatus). For example, the first vibration apparatus 200 may be implemented as a film type. In one embodiment, the first vibration apparatus 200 may be configured to output a sound of a first pitched sound band (e.g., a first pitch). For example, the first pitched sound band may include a high-pitched sound band. The first pitched sound band may be a sound of the high-pitched sound band or a middle-high pitched sound band. Thus, the display apparatus outputs sound having the first pitch responsive to the first vibration apparatus 200 vibrating. The first vibration apparatus 200 may be implemented as a film type, and thus, may have a thickness which is thinner than the vibration member 100 or the display panel, thereby reducing an increase in thickness of the vibration member 100 or the display panel caused by the disposition of the first vibration apparatus 200. For example, the first vibration apparatus 200 may be referred to as a first sound generating module, a first sound generating apparatus, a first vibration generating apparatus, a first displacement apparatus, a first sound apparatus, a piezoelectric type vibration apparatus, a film actuator, a film type piezoelectric composite actuator, a film speaker, a film type piezoelectric speaker, or a film type piezoelectric composite speaker, which uses the vibration member 100 or the display panel as a sound vibration plate, but the terms are not limited thereto.

The first vibration apparatus 200 may be connected with or coupled to the rear surface of the vibration member 100 or the display panel. For example, the first vibration apparatus 200 may be disposed at the rear surface of the vibration member 100 or the display panel to overlap a display area of the vibration member 100 or the display panel. For example, the first vibration apparatus 200 may overlap half or more of the display area of the vibration member 100 or the display panel. According to another embodiment of the present disclosure, the first vibration apparatus 200 may overlap all of the display area of the vibration member 100 or the display panel.

When an alternating current (AC) voltage is applied, the first vibration apparatus 200 according to an embodiment of the present disclosure may alternately repeat contraction and/or expansion based on an inverse piezoelectric effect to vibrate and may vibrate the vibration member 100 or the display panel, based on a vibration. For example, the first vibration apparatus 200 may vibrate based on a voice signal synchronized with an image displayed by the vibration member 100 or the display panel to vibrate the vibration member 100 or the display panel. According to another embodiment of the present disclosure, the first vibration apparatus 200 may vibrate based on a haptic feedback signal (or a tactile feedback signal) synchronized with a user touch applied to a touch panel (or a touch sensor layer) disposed in or embedded into the vibration member 100 or the display panel to vibrate the vibration member 100 or the display panel. Accordingly, the vibration member 100 or the display panel may vibrate based on a vibration of the first vibration apparatus 200 to provide a user (or a viewer) with at least one of a sound and the haptic feedback.

Therefore, the apparatus according to an embodiment of the present disclosure may output a sound, generated by a vibration of the vibration member 100 or the display panel based on a vibration of the first vibration apparatus 200, in a forward direction of the vibration member 100 or the display panel. Also, in the apparatus according to an embodiment of the present disclosure, most of the vibration member 100 or the display panel may be vibrated by the first vibration apparatus 200 of a film type, thereby more enhancing a sense of localization and a sound pressure level characteristic of a sound based on a vibration of the vibration member 100 or the display panel.

The apparatus according to an embodiment of the present disclosure may further include a connection member 160 (or a first connection member) between the vibration member 100 or the display panel and the first vibration apparatus 200.

For example, the connection member 160 may be disposed between the rear surface of the vibration member 100 or the display panel and the first vibration apparatus 200, and thus, may connect or couple the first vibration apparatus 200 to the rear surface of the vibration member 100 or the display panel. For example, the first vibration apparatus 200 may be connected with or coupled to the rear surface of the vibration member 100 or the display panel by using the connection member 160, and thus, may be supported by or disposed at the rear surface of the vibration member 100 or the display panel. For example, the first vibration apparatus 200 may be disposed at the rear surface of the vibration member 100 or the display panel by using the connection member 160. For example, the connection member 160 may connect together the vibration member 100 and the first vibration apparatus 200.

The connection member 160 according to an embodiment of the present disclosure may include a material including an adhesive layer which has a tacky force or adhesive force, with respect to each of the first vibration apparatus 200 and the rear surface of the vibration member 100 or the display panel. For example, the connection member 160 may include a foam pad, a double-sided tape, or an adhesive, but embodiments of the present disclosure are not limited thereto. For example, the adhesive layer of the connection member 160 may include epoxy, acryl, silicone, or urethane, but embodiments of the present disclosure are not limited thereto. For example, the adhesive layer of the connection member 160 may include an acrylic material (or substance), having a characteristic where an adhesive force is relatively good and hardness is high, of acryl and urethane. Accordingly, a vibration of the first vibration apparatus 200 may be well transferred to the vibration member 100 or the display panel.

The adhesive layer of the connection member 160 may further include an additive such as a tackifier, a wax component, or an antioxidant, but embodiments of the present disclosure are not limited thereto. The additive may prevent the connection member 160 from being detached (or striped) from the vibration member 100 or the display panel by a vibration of the vibration apparatus 20. For example, the tackifier may be rosin derivatives, and the wax component may be a paraffin wax. For example, the antioxidant may be a phenolic antioxidant such as thioester, but embodiments of the present disclosure are not limited thereto.

The connection member 160 according to another embodiment may further include a hollow portion provided between the vibration member 100 or the display panel and the first vibration apparatus 200. The hollow portion of the connection member 160 may provide an air gap between the vibration member 100 or the display panel and the first vibration apparatus 200. The air gap may allow a sound wave (or a sound pressure level) based on a vibration of the first vibration apparatus 200 to concentrate on the vibration member 100 or the display panel without being dispersed by the connection member 160, and thus, the loss of a vibration by the connection member 160 may be reduced, thereby increasing a sound characteristic and/or a sound pressure level characteristic of a sound generated based on a vibration of the vibration member 100 or the display panel.

The second vibration apparatus 200' according to an embodiment of the present disclosure may be implemented as a coil type vibration apparatus (e.g., a second type of vibration apparatus that is different from the first type of vibration apparatus). For example, the second vibration apparatus 200' may be implemented as a voice coil type. The second vibration apparatus 200' may be configured to output a sound of a second pitched sound band (e.g., a second pitch) which differs from the first pitched sound band. For example, the second pitched sound band may include a low-pitched sound band is that is lower than the high-pitched sound band. The second pitched sound band may be a sound of the low-pitched sound band or a middle-low pitched sound band. Thus, the display apparatus outputs sound having the second pitch responsive to the second vibration apparatus 200' vibrating. The second vibration apparatus 200' may be provided to overlap the first vibration apparatus 200. The second vibration apparatus 200' may be apart from the rear surface of the vibration member 100. The second vibration apparatus 200' may be spaced apart from the rear surface of the vibration member 100, and the first vibration apparatus 200 may be disposed between the vibration member 100 and the second vibration apparatus 200'. For example, the second vibration apparatus 200' may be provided to be stacked on the first vibration apparatus 200. The second vibration apparatus 200' may pass through a thickness of the supporting member 300 and may be disposed adjacent to the rear surface of the first vibration apparatus 200. The second vibration apparatus 200' may pass through the supporting member 300 and may contact the rear surface of the first vibration apparatus 200. The second vibration apparatus 200' may pass through the supporting member 300 and may be disposed at the rear surface of the vibration member 100 with the first vibration apparatus 200 therebetween, and thus, may directly or indirectly vibrate the vibration member 100. For example, an upper portion of the second vibration apparatus 200' may be inserted (or accommodated) into through holes 315 and 335 (or a first hole) provided in the supporting member 300 and may be adjacent to or connected with the rear surface of the first vibration apparatus 200, and a lower portion of the second vibration apparatus 200' may be supported by (or connected to or fixed to) the supporting member 300. For example, the second vibration apparatus 200' may vibrate by using the supporting member 300 as a support to directly or indirectly vibrate the vibration member 100, and the vibration member 100 may output the sound S in the forward direction D. For example, the second vibration apparatus 200' may be referred to as a second sound generating module, a second sound generating apparatus, a second vibration generating apparatus, a second displacement apparatus, a second sound apparatus, a coil type vibration apparatus, a voice coil type vibration apparatus, a transducer, an actuator, or an exciter, which uses the vibration member 100 or the display panel as a sound vibration plate, but the terms are not limited thereto.

In the apparatus according to an embodiment of the present disclosure, the first vibration apparatus 200 may be disposed between the vibration member 100 and the second vibration apparatus 200'.

The first vibration apparatus 200 may be disposed at the rear surface of the vibration member 100, and the second vibration apparatus 200' may be disposed at the rear surface of the first vibration apparatus 200. The first vibration apparatus 200 may be disposed between the vibration member 100 and the second vibration apparatus 200' and may reduce or decrease heat occurring in the second vibration apparatus 200'. For example, the first vibration apparatus 200 may prevent or at least reduce the transfer of heat, occurring in the second vibration apparatus 200', to the vibration member 100. The first vibration apparatus 200 may limit the local temperature rising of the vibration member 100 caused by heat occurring in the second vibration apparatus 200'. For example, the first vibration apparatus 200 may prevent or at least reduce the transfer of heat, occurring in the second vibration apparatus 200', to the display panel which is the vibration member 100. In this case, the first vibration apparatus 200 may limit the temperature rising of the display panel or the vibration member 100 caused by heat which occurs due to an operation of the second vibration apparatus 200' when the display panel or the vibration member 100 outputs a sound, and thus, may prevent or at least reduce an image quality defect of the display panel or the vibration member 100 from occurring due to a rapid temperature difference in a local region of the display panel or the vibration member 100 overlapping the second vibration apparatus 200'.

According to an embodiment of the present disclosure, the first vibration apparatus 200 may be disposed at the rear surface of the display panel or the vibration member 100 by using a connection member 160. The first vibration apparatus 200 may be configured to cover the second vibration apparatus 200' or to have a size which is greater than that of the second vibration apparatus 200'. For example, the first vibration apparatus 200 may have a polygonal plate shape or a circular plate shape having a certain thickness, but embodiments of the present disclosure are not limited thereto. In the apparatus according to an embodiment of the present disclosure, the first vibration apparatus 200 between the vibration member 100 and the second vibration apparatus 200' may further perform a function of preventing or reducing the transfer of heat, occurring in the second vibration apparatus 200', to the vibration member 100, and thus, an adverse effect of heat occurring when the second vibration apparatus 200' is vibrating may be reduced on the display panel or the vibration member 100 or the image quality of the display panel.

The apparatus according to an embodiment of the present disclosure may further include a supporting member 300 which is disposed at a rear surface (or a backside surface) of the vibration member 100.

The supporting member 300 may be disposed at the rear surface of the vibration member 100 or the display panel. For example, the supporting member 300 may cover the rear surface of the vibration member 100 or the display panel. For example, the supporting member 300 may cover the whole rear surface of the vibration member 100 or the display panel with a gap space GS (or an internal space) therebetween. The supporting member 300 may be spaced apart from a rearmost surface of the vibration member 100 or the display panel with the gap space GS therebetween, or may be spaced apart from the first vibration apparatus 200. For example, the gap space GS may be referred to as an internal space, an air gap, a vibration space, or a sound sounding box, but the terms are not limited thereto.

For example, the supporting member 300 may include one or more materials of a glass material, a metal material, and a plastic material. For example, the supporting member 300 may be a rear structure material, a set structure material, a supporting structure material, a supporting cover, a rear member, a case, or a housing, but the terms are not limited thereto. The supporting member 300 may be referred to as the other term such as a cover bottom, a plate bottom, a back cover, a base frame, a metal frame, a metal chassis, a chassis base, or an m-chassis. For example, the supporting member 300 may be implemented as an arbitrary type frame or a plate structure material each disposed at the rear surface of the vibration member 100.

An edge or a sharp corner of the supporting member 300 may have an inclined shape or a curved shape through a chamfer process or a corner rounding process. For example, the glass material of the supporting member 300 may be sapphire glass. In another embodiment of the present disclosure, the supporting member 300 including the metal material may include one or more materials of aluminum (Al), an Al alloy, magnesium (Mg), a Mg alloy, and an iron (Fe)-nickel (Ni) alloy.

The supporting member 300 according to an embodiment of the present disclosure may include the through holes 315 and 335 (or the first hole) into which the second vibration apparatus 200' is inserted (or accommodated). For example, the through holes 315 and 335 may be punched to have a circular or polygonal shape in a predetermined partial region of the supporting member 300 in a thickness direction Z of the supporting member 300, so that the second vibration apparatus 200' is inserted (or accommodated) therein.

According to an embodiment of the present disclosure, the through holes 315 and 335 (or the first hole) may be provided for decreasing an air pressure of the gap space GS (or the internal space) between the vibration member 100 and the supporting member 300. For example, the through holes 315 and 335 may provide a path into which the second vibration apparatus 200' may be inserted (or accommodated) and may provide a path which enables the gap space GS between the vibration member 100 and the supporting member 300 to be connected or communicate with the outside. In this case, the second vibration apparatus 200' may include an air penetration hole (or a second hole) which is formed in a portion overlapping the through holes 315 and 335. For example, the air penetration hole of the second vibration apparatus 200' may be formed to pass through or vertically pass through a portion, overlapping each of the through holes 315 and 335, of the second vibration apparatus 200'. Therefore, the gap space GS between the vibration member 100 and the supporting member 300 or an inner portion of the second vibration apparatus 200' may be connected or communicate with the outside through the through holes 315 and 335 of the supporting member 300 and the air penetration hole of the second vibration apparatus 200', and thus, an air pressure of the gap space GS between the vibration member 100 and the supporting member 300 or an air pressure of the inner portion of the second vibration apparatus 200' may be reduced.

The supporting member 300 according to an embodiment of the present disclosure may include a first supporting member 310 and a second supporting member 330.

The first supporting member 310 may be disposed between the second supporting member 330 and the rear surface of the vibration member 100 or the display panel. For example, the first supporting member 310 may be disposed between a rear edge portion of the vibration member 100 or the display panel and a front edge portion of the second supporting member 330. That is, the first supporting member 310 is between the vibration member 100 and the second supporting member 330. The first supporting member 310 may support one or more of an edge portion of the vibration member 100 or the display panel and an edge portion of the second supporting member 330. In another embodiment of the present disclosure, the first supporting member 310 may cover the majority of the rear surface of the vibration member 100 or the display panel. For example, the first supporting member 310 may cover the majority of the whole rear surface of the vibration member 100 or the display panel except for the area overlapped by the second vibration apparatus 200'. For example, the first supporting member 310 may be a member which covers the whole rear surface of the vibration member 100 or the display panel. For example, the first supporting member 310 may include one or more materials of a glass material, a metal material, and a plastic material. For example, the first supporting member 310 may be an inner plate, a first rear structure material, a first supporting structure material, a first supporting cover, a first back cover, a first rear member, an internal plate, or an internal cover, but the terms are not limited thereto. For example, the first supporting member 310 may be omitted.

The first supporting member 310 may be spaced apart from a rearmost surface of the vibration member 100 with the gap space GS therebetween. The first supporting member 310 may support or fix the vibration apparatus 200. For example, the gap space GS may be referred to as an internal space, an air gap, a vibration space, or a sound sounding box, but the terms are not limited thereto.

The second supporting member 330 may be disposed at a rear surface of the first supporting member 310. The second supporting member 330 may be a member which covers the majority of the whole rear surface of the vibration member 100 or the display panel except for the portion of the vibration member 100 overlapped by the second vibration apparatus 200'. For example, the second supporting member 330 may include one or more materials of a glass material, a metal material, and a plastic material. For example, the second supporting member 330 may be an outer plate, a rear plate, a back plate, a back cover, a rear cover, a second rear structure material, a second supporting structure material, a second supporting cover, a second back cover, a second rear member, an external plate, or an external cover, but the terms are not limited thereto.

According to an embodiment of the present disclosure, the first supporting member 310 and the second supporting member 330 may each include through holes 315 and 335 (or a first hole) into which the second vibration apparatus 200' is inserted (or accommodated). For example, the through holes 315 and 335 may be punched to have a circular or polygonal shape in a predetermined partial region of each of the first supporting member 310 and the second supporting member 330 in a thickness direction Z of the first supporting member 310 and the second supporting member 330, so that the second vibration apparatus 200' is inserted (or accommodated) therein. For example, the first supporting member 310 may include a first through hole 315, and the second supporting member 330 may include a second through hole 335. For example, the first through hole 315 of the first supporting member 310 may have the same size as that of the second through hole 335 of the second supporting member 330, or may have a size which is less than that of the second through hole 335 of the second supporting member 330. For example, the first through hole 315 of the first supporting member 310 may have a size which is less than that of the second through hole 335 of the second supporting member 330, and a portion of the rear surface of the first supporting member 310 may be exposed through the second through hole 335 of the second supporting member 330. In this case, the second vibration apparatus 200' may be fixed to the rear surface of the first supporting member 310 exposed by the second through hole 335 of the second supporting member 330. For example, an upper portion (or one side) of the second vibration apparatus 200' may pass through the through holes 315 and 335 of the first supporting member 310 and the second supporting member 330 and may contact an end of the second vibration member 330, and a lower portion (or the other side) of the second vibration apparatus 200' may be fixed to the rear surface of the first supporting member 310 exposed by the second through hole 335 of the second supporting member 330.

According to an embodiment of the present disclosure, the first supporting member 310 and the second supporting member 330 may include different materials. For example, the first supporting member 310 may include a metal material such as an aluminum (Al) material which is good in heat conductivity, and the second supporting member 330 may include a glass material, but embodiments of the present disclosure are not limited thereto.

According to an embodiment of the present disclosure, the first supporting member 310 and the second supporting member 330 may have the same thickness or different thicknesses. For example, the first supporting member 310 may have a thickness which is relatively thinner than the second supporting member 330, but embodiments of the present disclosure are not limited thereto.

The supporting member 300 according to an embodiment of the present disclosure may further include a connection member 350.

The connection member 350 may be disposed between the first supporting member 310 and the second supporting member 330. For example, the first supporting member 310 and the second supporting member 330 may be coupled to or connected with each other by the connection member 350. For example, the connection member 350 may be an adhesive resin, a double-sided tape, or a double-sided adhesive foam pad, but embodiments of the present disclosure are not limited thereto. For example, the connection member 350 may have elasticity for absorbing an impact, but embodiments of the present disclosure are not limited thereto. For example, the connection member 350 may be disposed in a whole region between the first supporting member 310 and the second supporting member 330. According to another embodiment of the present disclosure, the connection member 350 may be formed in a mesh structure having an air gap between the first supporting member 310 and the second supporting member 330.

The apparatus according to an embodiment of the present disclosure may further include a middle frame 400. The middle frame 400 may be disposed between a rear edge portion of the vibration member 100 or the display panel and a front edge portion of the supporting member 300. The middle frame 400 may support one or more of an edge portion of the vibration member 100 or the display panel and an edge portion of the supporting member 300. The middle frame 400 may surround one or more of lateral surfaces (e.g., ends or edges) of each of the vibration member 100 or the display panel and the supporting member 300. The middle frame 400 may provide a gap space GS between the vibration member 100 or the display panel and the supporting member 300. The middle frame 400 may be referred to as a middle cabinet, a middle cover, a middle chassis, a connection member, a frame, a frame member, a middle member, or a side cover member, but the terms are not limited thereto.

The middle frame 400 according to an embodiment of the present disclosure may include a first supporting portion 410 and a second supporting portion 430. For example, the first supporting portion 410 may be a supporting portion, but the terms are not limited thereto. For example, the second supporting portion 430 may be a sidewall portion, but the terms are not limited thereto.

The first supporting portion 410 may be disposed between the rear edge (e.g., rear surface) of the vibration member 100 or the display panel and the front edge (e.g., front surface) of the supporting member 300, and thus, may provide a gap space GS between the vibration member 100 or the display panel and the supporting member 300. A front surface of the first supporting portion 410 may be coupled to or connected with the rear edge portion of the vibration member 100 or the display panel by a first adhesive member 401. A rear surface of the first supporting portion 410 may be coupled to or connected with the front edge of the supporting member 300 by a second adhesive member 403. For example, the first supporting portion 410 may have a single tetragonal picture frame structure, or may have a picture frame structure including a plurality of division bar shapes, but embodiments of the present disclosure are not limited thereto.

The second supporting portion 430 may be arranged in parallel with the thickness direction Z of the apparatus. For example, the second supporting portion 430 may be vertically coupled to an outer surface of the first supporting part 410 in parallel with the thickness direction Z of the apparatus. The second supporting portion 430 may surround one or more of an outer surface of the vibration member 100 and an outer surface of the supporting member 300, thereby protecting the outer surface of each of the vibration member 100 and the supporting member 300. The first supporting portion 410 may protrude from an inner surface of the second supporting portion 430 to the gap space GS between the vibration member 100 and the supporting member 300.

The apparatus according to an embodiment of the present disclosure may include a panel connection member (or a connection member) instead of the middle frame 400.

The panel connection member may be disposed between a rear edge portion of the vibration member 100 and a front edge portion of the supporting member 300, and thus, may provide the gap space GS between the vibration member 100 and the supporting member 300. For example, the panel connection member may be implemented as a double-sided tape, a single-sided tape, or a double-sided adhesive foam pad, but embodiments of the present disclosure are not limited thereto. For example, an adhesive layer of the panel connection member may include epoxy, acryl, silicone, or urethane, but embodiments of the present disclosure are not limited thereto. For example, the adhesive layer of the panel connection member may include a urethane-based material (or substance) having a relatively ductile characteristic among acryl and urethane, so as to minimize the transfer of a vibration of the vibration member 100 to the supporting member 300. Accordingly, a vibration of the vibration member 100 transferred to the supporting member 300 may be minimized.

In the apparatus according to an embodiment of the present disclosure, when the apparatus includes the panel connection member instead of the middle frame 400, the supporting member 300 may include a bending sidewall which is bent from one side (or an end) of the second supporting member 330 and surrounds one or more of outer surfaces (or outer sidewalls) of the first supporting member 310, the panel connection member, and the vibration member 100. The bending sidewall according to an embodiment of the present disclosure may have a single sidewall structure or a hemming structure. The hemming structure may denote a structure where ends of an arbitrary member is bent in a curved shape to overlap each other, or are spaced apart from each other in parallel. For example, in order to enhance a sense of beauty in design, the bending sidewall may include a first bending sidewall, which is bent from one side (or an end) of the second supporting member 330, and a second bending sidewall which is bent from the first bending sidewall to a region between the first bending sidewall and the outer surface of the vibration member 100. The second bending sidewall may be apart from an inner surface of the first bending sidewall, so as to decrease the transfer of an external impact to the outer surface of the vibration member 100 in a lateral direction or a contact between the outer surface of the vibration member 100 and the inner surface of the first bending sidewall. Accordingly, the second bending sidewall may decrease the transfer of the external impact to the outer surface of the vibration member 100 in the lateral direction or a contact between the outer surface of the vibration member 100 and the inner surface of the first bending sidewall.

According to another embodiment of the present disclosure, the middle frame 400 may be omitted in the apparatus according to an embodiment of the present disclosure. The panel connection member or an adhesive may be provided instead of the middle frame 400. According to another embodiment of the present disclosure, a partition may be provided instead of the middle frame 400.

Figure 3:
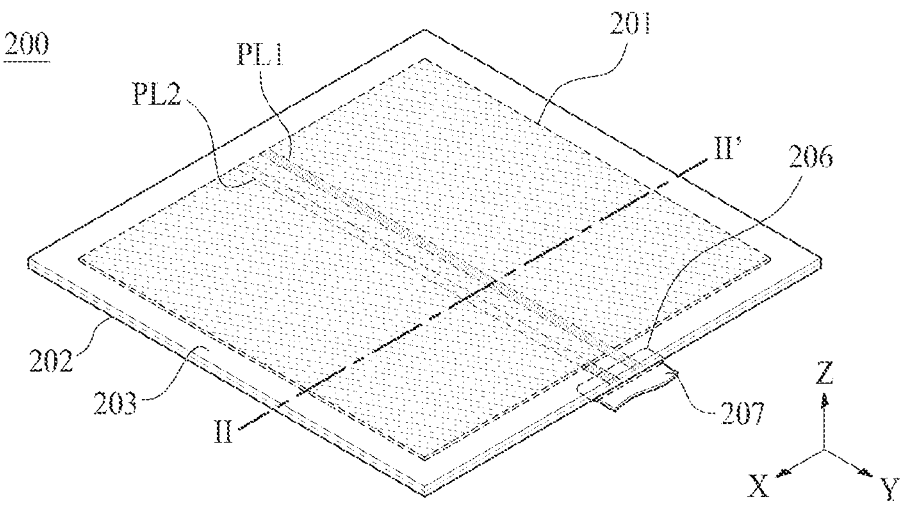
FIG. 3 illustrates a vibration apparatus according to an embodiment of the present disclosure.
Figure 4:
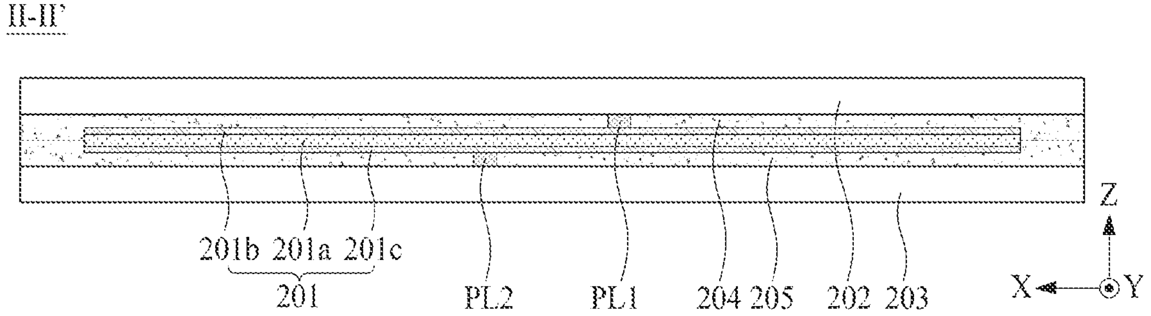
FIG. 4 is a cross-sectional view taken along line II-If illustrated in FIG. 3 according to an embodiment of the present disclosure.
Figure 5:
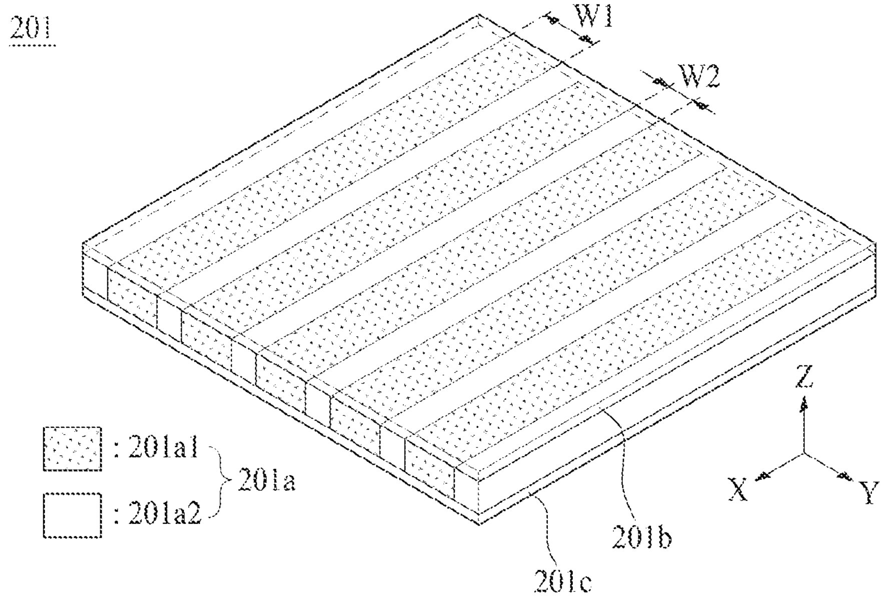
FIG. 5 illustrates a vibration portion illustrated in FIG. 4 according to an embodiment of the present disclosure.

FIG. 3 illustrates a vibration apparatus according to an embodiment of the present disclosure. FIG. 4 is a cross-sectional view taken along line II-If illustrated in FIG. 3 according to an embodiment of the present disclosure. FIG. 5 illustrates a vibration portion illustrated in FIG. 4 according to an embodiment of the present disclosure. FIGS. 3 to 5 illustrate the first vibration apparatus described above with reference to FIGS. 1 and 2.

Referring to FIGS. 3 to 5, a first vibration apparatus 200 according to another embodiment of the present disclosure may be referred to as an active vibration member, a vibration apparatus, a flexible vibration apparatus, a flexible vibration structure material, a flexible vibrator, a flexible vibration generating apparatus, a flexible vibration generator, a flexible sounder, a flexible sound apparatus, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but embodiments of the present disclosure are not limited thereto.

The first vibration apparatus 200 according to another embodiment of the present disclosure may include a vibration portion 201. For example, the vibration portion 201 may be a piezoelectric vibration portion or a piezoelectric type vibration portion. The vibration portion 201 may include a vibration layer 201*a*, a first electrode layer 201*b*, and a second electrode layer 201*c*.

The vibration layer 201*a* may include a piezoelectric material (or an electroactive material) having a piezoelectric effect. For example, the piezoelectric material may have a characteristic where pressure or twisting is applied to a crystalline structure by an external force, a potential difference occurs due to dielectric polarization (or poling) caused by a relative position change of a positive (+) ion and a negative (−) ion, and a vibration is generated by an electric field based on a voltage applied thereto. The vibration layer 201*a* may be referred to as the terms such as a piezoelectric layer, a piezoelectric material layer, an electroactive layer, a vibration portion, a piezoelectric material portion, an electroactive portion, a piezoelectric structure, a piezoelectric composite layer, a piezoelectric composite, or a piezoelectric ceramic composite, but the terms are not limited thereto. The vibration layer 201*a* may include a transparent conductive material, a semitransparent conductive material, or an opaque conductive material and may be transparent, semitransparent, or opaque.

The vibration portion 201 according to an embodiment of the present disclosure may include a plurality of inorganic material portions and an organic material portion between the plurality of inorganic material portions. For example, the plurality of inorganic material portions may have a piezoelectric characteristic. For example, the plurality of inorganic material portions may be a first portion 201*al*, and the organic material portion may be a second portion 201*a*2. For example, the vibration layer 201*a* may include a plurality of first portions 201*a*1 and a plurality of second portions 201*a*2. For example, the plurality of first portions 201*a*1 and the plurality of second portions 201*a*2 may be alternately arranged in a first direction X (or a second direction Y). For example, the first direction X may be a horizontal direction of the vibration layer 201*a* and the second direction Y may be a vertical direction of the vibration layer 201*a* intersecting with the first direction X, but embodiments of the present disclosure are not limited thereto and the first direction X may be a vertical direction of the vibration layer 201*a* and the second direction Y may be a horizontal direction of the vibration layer 201*a*.

Each of the plurality of first portions 201*a*1 may include an inorganic material portion. The inorganic material portion may include a piezoelectric material, a composite piezoelectric material, or an electroactive material, which has a piezoelectric effect, but embodiments of the present disclosure are not limited thereto.

Each of the plurality of first portions 201*a*1 may include a ceramic-based material for generating a relatively high vibration, or may include a piezoelectric ceramic having a perovskite-based crystalline structure. The perovskite crystalline structure may have a piezoelectric effect and/or an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "0" may be anions. For example, the first portions 201*a*1 may include one or more of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization (or poling), and a piezoelectric effect may be generated based on the variation of the polarization (or poling). In a perovskite crystalline structure including $PbTiO_3$, a position of a Ti ion corresponding to a center ion may be changed to vary polarization (or poling), and thus, a piezoelectric effect may be generated. For example, in the perovskite crystalline structure, a cubic shape having a symmetric structure may be changed to a tetragonal shape, an orthorhombic shape, and a rhombohedral shape each having an unsymmetric structure by using an external stress or a magnetic field, and thus, a piezoelectric effect may be generated. Polarization (or poling) may be high at a morphotropic phase boundary (MPB) of a tetragonal structure and a rhombohedral structure, and polarization (or poling) may be easily realigned, thereby obtaining a high piezoelectric characteristic.

The vibration layer 201*a* or the first portion 201*a*1 according to another embodiment of the present disclosure may include one or more of lead (Pb), zirconium (Zr), titanium (Ti), zinc (Zn), nickel (Ni), and niobium (Nb), but embodiments of the present disclosure are not limited thereto.

According to another embodiment of the present disclosure, the vibration layer 201*a* or the first portion 201*a*1 may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. According to another embodiment of the present disclosure, the vibration layer 201*a* may include one or more of calcium titanate ($CaTiO_3$), $BaTiO_3$, and $SrTiO_3$, each including no Pb, but embodiments of the present disclosure are not limited thereto.

Each of the plurality of first portions 201*a*1 according to an embodiment of the present disclosure may be disposed between two adjacent second portions 201*a*2 of the plurality of second portions 201*a*2, and moreover, may have a first width W1 parallel to the first direction X (or the second direction Y) and may have a length parallel to the second direction Y (or the first direction X). Each of the plurality of second portions 201*a*2 may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 201*a*1 and the second portion 201*a*2 may include a line shape or a stripe shape having the same size or different sizes. Accordingly, the vibration layer 201*a* may include a 2-2 composite structure having a piezoelectric characteristic of a 2-2 vibration mode, and thus, may have a resonance frequency of 20 kHz or less, but embodiments of the present disclosure are not limited thereto. For example, the resonance frequency of the vibration layer 201*a* may vary based on one or more of a shape, a length, and a thickness.

In the vibration layer 201*a*, the plurality of first portions 201*a*1 and the plurality of second portions 201*a*2 may be disposed (or arranged) in parallel on the same plane (or the same layer). Each of the plurality of second portions 201*a*2 may be configured to fill a gap between two adjacent first portions 201*al*, and thus, each of the plurality of second portions 201*a*2 may be connected to or attached on an adjacent first portion 201*a*1. Accordingly, the vibration layer 201*a* may extend by a desired size or length on the basis of lateral coupling (or connection) of the first portion 201*a*1 and the second portion 201*a*2.

In the vibration layer 201*a*, the second width W2 of each of the plurality of second portions 201*a*2 may decrease progressively in a direction from a center portion of the vibration layer 201*a* or the first vibration apparatus 200 to both edge portions (or both ends) thereof.

According to an embodiment of the present disclosure, when the vibration layer 201*a* or the first vibration apparatus 200 vibrates in an upward and downward direction Z (or a thickness direction), a second portion 201*a*2 having a largest second width W2 among the plurality of second portions 201*a*2 may be disposed at a portion on which a largest stress concentrates. When the vibration layer 201*a* or the first vibration apparatus 200 vibrates in the upward and downward direction Z, a second portion 201*a*2 having a smallest second width W2 among the plurality of second portions 201*a*2 may be disposed at a portion where a relatively smallest stress occurs. For example, the second portion 201*a*2 having the largest second width W2 among the plurality of second portions 201*a*2 may be disposed at a center portion of the vibration layer 201*a*, and the second portion 201*a*2 having the smallest second width W2 among the plurality of second portions 201*a*2 may be disposed at both edge portions of the vibration layer 201*a*. Accordingly, when the vibration layer 201*a* or the first vibration apparatus 200 vibrates in the upward and downward direction Z, an overlap of a resonance frequency or interference of a sound wave generated in a portion on which a largest stress concentrates may be reduced, and thus, the dipping of a sound pressure level generated in a low pitched sound band may decrease and the flatness of a sound characteristic of the low pitched sound band may be improved. For example, the flatness of a sound characteristic may be a magnitude of a deviation between a highest sound pressure level and a lowest sound pressure level.

In the vibration layer 201*a*, the plurality of first portions 201*a*1 may have different sizes (or widths). For example, a size (or a width) of each of the plurality of first portions 201*a*1 may decrease or increase progressively in a direction from the center portion of the vibration layer 201*a* or the first vibration apparatus 200 to both edge portions (or both ends) thereof. Therefore, a sound pressure level characteristic of a sound of the vibration layer 201*a* may be enhanced by different inherent vibration frequencies based on vibrations of the plurality of first portions 201*a*1 having different sizes, and a reproduction band of a sound may extend.

Each of the plurality of second portions 201*a*2 may be disposed between the plurality of first portions 201*a*1. Therefore, in the vibration layer 201*a* or the first vibration apparatus 200, vibration energy based on a chain in a unit lattice of the first portion 201*a*1 may be increased by the second portion 201*a*2, and thus, a vibration characteristic may increase and a piezoelectric characteristic and flexibility may be secured. For example, the second portion 201*a*2 may include one of an epoxy-based polymer, an acrylic-based polymer, and a silicone-based polymer, but embodiments of the present disclosure are not limited thereto.

Each of the plurality of second portions 201*a*2 according to an embodiment of the present disclosure may include an organic material portion. For example, each of the organic material portions may be disposed between two adjacent inorganic material portions of the plurality of inorganic material portions, and thus, may absorb an impact applied to a corresponding inorganic material portion (or a first portion), a stress concentrating on the inorganic material portion may be released to enhance the durability of the vibration layer 201*a* or the first vibration apparatus 200, and flexibility may be provided to the vibration layer 201*a* or the first vibration apparatus 200. Accordingly, the first vibration apparatus 200 may be configured to have flexibility.

The second portion 201*a*2 according to an embodiment may have modulus (or young's modulus) and viscoelasticity which are less than those of the first portion 201*a*1, and thus, may enhance the reliability of the first portion 201*a*1 which is vulnerable to an impact due to a fragile characteristic thereof. For example, the second portion 201*a*2 may include a material which has a loss coefficient of 0.01 to 1 and a modulus of 0.1 Gpa to 10 Gpa (Gigapascal).

The organic material portion included in the second portion 201*a*2 may include an organic material, an organic polymer, an organic piezoelectric material, or an organic non-piezoelectric material having a flexible characteristic compared to the inorganic material portion which is the first portion 201*al*. For example, the second portion 201*a*2 may be referred to as an adhesive portion, a flexible portion, a bending portion, a damping portion, or a ductile portion, or the like, but embodiments of the present disclosure are not limited thereto.

The plurality of first portions 201*a*1 and the plurality of second portions 201*a*2 may be disposed on (or connected to) the same plane, and thus, the vibration layer 201*a* according to a disclosure of the present embodiment may have a single thin film form. For example, the vibration layer 201*a* may have a structure where the plurality of first portions 201*a*1 are connected to one side thereof. For example, the vibration layer 201*a* may have a structure where the plurality of first portions 201*a*1 are connected in all of the vibration layer 201*a*. For example, the vibration layer 201*a* may be vibrated in a vertical direction by the first portion 201*a*1 having a vibration characteristic and may be bent in a curved shape by the second portion 201*a*2 having flexibility. Also, in the vibration layer 201*a* according to an embodiment of the present disclosure, a size of the first portion 201*a*1 and a size of the second portion 201*a*2 may be adjusted based on a piezoelectric characteristic and flexibility needed for the vibration layer 201*a* or the vibration apparatus 200. For example, in the vibration layer 201*a* requiring a piezoelectric characteristic rather than flexibility, a size of the first portion 201*a*1 may be adjusted to be greater than that of the second portion 201*a*2. In another embodiment of the present disclosure, in the vibration layer 201*a* requiring flexibility rather than a piezoelectric characteristic, a size of the second portion 201*a*2 may be adjusted to be greater than that of the first portion 201*a*1. Accordingly, a size of the vibration layer 201*a* may be adjusted based on a desired characteristic, and thus, the vibration layer 201*a* may be easily designed.

The first electrode layer 201*b* may be disposed on a first surface (or an upper surface) of the vibration layer 201*a*. The first electrode layer 201*b* may be disposed at or coupled (or connected) to a first surface of each of the plurality of first portions 201*a*1 and a first surface of each of the plurality of second portions 201*a*2 in common and may be electrically connected with the first surface of each of the plurality of first portions 201*al*. For example, the first electrode layer 201*b* may have a single electrode (or one electrode) shape disposed at the whole first surface of the vibration layer 201*a*. For example, the first electrode layer 201*b* may have substantially the same shape as that of the vibration layer 201*a*, but embodiments of the present disclosure are not limited thereto.

The second electrode layer 201*c* may be disposed on a second surface (or a rear surface), which is different from (or opposite to) the first surface, of the vibration layer 201*a*. The second electrode layer 201*c* may be disposed at or coupled (or connected) to a second surface of each of the plurality of first portions 201*a*1 and a second surface of each of the plurality of second portions 201*a*2 in common and may be electrically connected with the second surface of each of the plurality of first portions 201a1. For example, the second electrode layer 201c may have a single electrode (or one electrode) shape disposed at the whole second surface of the vibration layer 201a. For example, the second electrode layer 201c may have substantially the same shape as that of the vibration layer 201a, but embodiments of the present disclosure are not limited thereto.

One or more of the first electrode layer 201b and the second electrode layer 201c according to an embodiment of the present disclosure may include a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. Examples of the opaque conductive material may include aluminum (Al), copper (Cu), gold (Au), silver (Ag), molybdenum (Mo), and magnesium (Mg) or an alloy thereof, but embodiments of the present disclosure are not limited thereto.

The vibration layer 201a may be polarized by a certain voltage applied to the first electrode layer 201b and the second electrode layer 201c in a certain temperature atmosphere or a temperature atmosphere which is changed from a high temperature to a room temperature, but embodiments of the present disclosure are not limited thereto. For example, the vibration layer 201a may alternately repeat contraction and/or expansion according to an inverse piezoelectric effect based on a sound signal (or a voice signal or a driving signal) applied from the outside to the first electrode layer 201b and the second electrode layer 201c, and thus, may vibrate. For example, the vibration layer 201a may vibrate based on a vertical-direction vibration and a horizontal-direction vibration, based on the sound signal applied to the first electrode layer 201b and the second electrode layer 201c. The vibration layer 201a may increase a displacement of a vibration member, based on contraction and/or expansion in a horizontal direction, thereby more enhancing a vibration of the vibration member.

The first vibration apparatus 200 according to an embodiment of the present disclosure may further include a first cover member 202 and a second cover member 203.

The first cover member 202 may be disposed on a first surface of the vibration portion 201. For example, the first cover member 202 may be configured to cover the first electrode layer 201b. Accordingly, the first cover member 202 may protect the first electrode layer 201b.

The second cover member 203 may be disposed on a second surface of the vibration portion 201. For example, the second cover member 203 may be configured to cover the second electrode layer 201c. Accordingly, the second cover member 203 may protect the second electrode layer 201c.

Each of the first cover member 202 and the second cover member 203 according to an embodiment of the present disclosure may include one or more materials of plastic, fiber, and wood, but embodiments of the present disclosure are not limited thereto. For example, the first cover member 202 and the second cover member 203 may include the same material or different materials. For example, the first cover member 202 and the second cover member 203 may be a polyimide film or a polyethylene terephthalate film, but embodiments of the present disclosure are not limited thereto.

The first cover member 202 according to an embodiment of the present disclosure may be connected or coupled to the first electrode layer 201b by using a first adhesive layer 204. For example, the first cover member 202 may be connected or coupled to the first electrode layer 201b through a film laminating process using the first adhesive layer 204.

A second cover member 203 according to an embodiment of the present disclosure may be connected with or coupled to the second electrode layer 201c by using a second adhesive layer 205. For example, the second cover member 203 may be connected with or coupled to the second electrode layer 201c by a film laminating process using the second adhesive layer 205. For example, the vibration apparatus 200 may be implemented as one film by using the first cover member 202 and the second cover member 203.

The first adhesive layer 204 may be disposed between the first electrode layer 201b and the first cover member 202. The second adhesive layer 205 may be disposed between the second electrode layer 201c and the second cover member 203. For example, the first adhesive layer 204 and the second adhesive layer 205 may be provided between the first cover member 202 and the second cover member 203 to surround the vibration layer 201a, the first electrode layer 201b, and the second electrode layer 201c. For example, the first adhesive layer 204 and the second adhesive layer 205 may be provided between the first cover member 202 and the second cover member 203 to fully surround the vibration layer 201a, the first electrode layer 201b, and the second electrode layer 201c. For example, the vibration layer 201a, the first electrode layer 201b, and the second electrode layer 201c may be buried or embedded between the first adhesive layer 204 and the second adhesive layer 205.

Each of the first adhesive layer 204 and the second adhesive layer 205 according to an embodiment of the present disclosure may include an electrical insulation material which has adhesive properties and is capable of compression and decompression. For example, each of the first adhesive layer 204 and the second adhesive layer 205 may include epoxy resin, acrylic resin, silicone resin, and urethane resin, but embodiments of the present disclosure are not limited thereto.

The first vibration apparatus 200 according to an embodiment of the present disclosure may further include a first power supply line PL1 which is disposed on the first cover member 202, a second power supply line PL2 which is disposed on the second cover member 203, and a pad portion 206 which is electrically connected to the first power supply line PL1 and the second power supply line PL2.

The first power supply line PL1 may be disposed between the first electrode layer 201b and the first cover member 202 and may be electrically connected to the first electrode layer 201b. The first power supply line PL1 may extend long in a second direction Y and may be electrically connected to a center portion of the first electrode layer 201b. In an embodiment, the first power supply line PL1 may be electrically connected to the first electrode layer 201b by using an anisotropic conductive film. In another embodiment, the first power supply line PL1 may be electrically connected to the first electrode layer 201b through a conductive material (or particles) included in the first adhesive layer 204.

The second power supply line PL2 may be disposed between the second electrode layer 201c and the second cover member 203 and may be electrically connected to the second electrode layer 201c. The second power supply line PL2 may extend long in the second direction Y and may be electrically connected to a center portion of the second electrode layer 201c. In an embodiment, the second power supply line PL2 may be electrically connected to the second electrode layer 201c by using an anisotropic conductive film. In another embodiment, the second power supply line PL2 may be electrically connected to the second electrode portion 201*c* through a conductive material (or particles) included in the second adhesive layer 205.

According to an embodiment of the present disclosure, a first power supply line PL1 and a second power supply line PL2 may be disposed not to overlap each other (e.g., non-overlapping) as shown in FIGS. 3 and 4. When the first power supply line PL1 is disposed not to overlap the second power supply line PL2, a problem of a short circuit defect between the first power supply line PL1 and the second power supply line PL2 may be solved.

The pad portion 206 may be provided at one edge portion of one of the first cover member 202 and the second cover member 203 so as to be electrically connected to one side (or one end) of each of the first power supply line PL1 and the second power supply line PL2.

The pad portion 206 according to an embodiment of the present disclosure may include a first pad electrode which is electrically connected to one end of the first power supply line PL1 and a second pad electrode which is electrically connected to one end of the second power supply line PL2.

The first pad electrode may be disposed at one edge portion of one of the first cover member 202 and the second cover member 203 and may be connected to one end of the first power supply line PL1. For example, the first pad electrode may pass through one of the first cover member 202 and the second cover member 203 and may be electrically connected to one end of the first power supply line PL1.

The second pad electrode may be disposed in parallel with the first pad electrode and may be connected to one end of the second power supply line PL2. For example, the second pad electrode may pass through one of the first cover member 202 and the second cover member 203 and may be electrically connected to one end of the second power supply line PL2.

According to an embodiment of the present disclosure, each of the first power supply line PL1, the second power supply line PL2, and the pad portion 206 may be configured to be transparent, semitransparent, or opaque.

A pad portion 206 according to an embodiment of the present disclosure may be electrically connected with a signal connection member 207.

The signal connection member 207 may be electrically connected with the pad portion 206 disposed in the first vibration apparatus 200 and may supply the first vibration apparatus 200 with a vibration driving signal (or a sound signal or a voice signal) provided from a sound processing circuit. The signal connection member 207 according to an embodiment of the present disclosure may include a first terminal electrically connected with a first pad electrode of the pad portion 206 and a second terminal electrically connected with a second pad electrode of the pad portion 206. For example, the signal connection member 207 may include at least one of a signal cable, a probe pin, and a pogo pin. For example, the signal connection member 207 may be configured as a flexible printed circuit cable, a flexible flat cable, a single-sided flexible printed circuit, a single-sided flexible printed circuit board (PCB), a flexible multi-layer printed circuit, or a flexible multi-layer PCB, but embodiments of the present disclosure are not limited thereto.

The sound processing circuit may generate an alternating current (AC) vibration driving signal including a first vibration driving signal and a second vibration driving signal on the basis of sound data provided from an external sound data generating circuit. The first vibration driving signal may be one of a positive (+) vibration driving signal and a negative (−) vibration driving signal, and the second vibration driving signal may be one of the positive (+) vibration driving signal and the negative (−) vibration driving signal. For example, the first vibration driving signal may be supplied to the first electrode layer 201*b* through the first terminal of the signal connection member 207, the first pad electrode of the pad portion 206, and the first power supply line PL1. The second vibration driving signal may be supplied to the second electrode layer 201*c* through the second terminal of the signal connection member 207, the second pad electrode of the pad portion 206, and the second power supply line PL2.

According to an embodiment, the signal connection member 207 may be configured to be transparent, semitransparent, or opaque.

The first vibration apparatus 200 according to an embodiment of the present disclosure may be implemented in a manner that a thin film as the first portion 201*a*1 having a piezoelectric characteristic and the second portion 201*a*2 having flexibility are alternately and repeatedly connected with each other. Therefore, a vibration width (or a displacement width) of the first vibration apparatus 200 may increase based on the second portion 201*a*2 having flexibility. Accordingly, a sound characteristic and/or a sound pressure level characteristic of a low pitched sound band generated based on a vibration of the vibration member may be enhanced.

Figure 6:
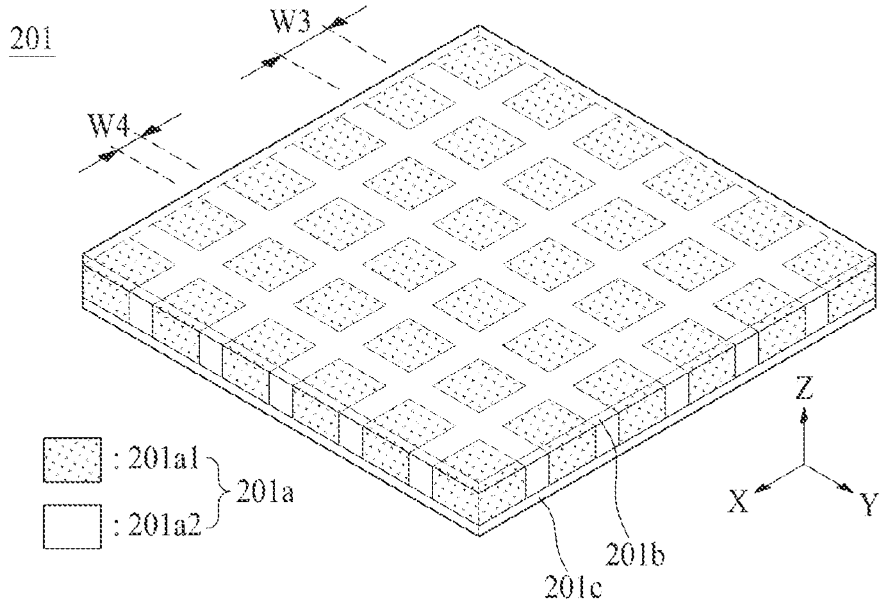
FIGS. 6 to 8 illustrate another embodiment of the vibration portion illustrated in FIG. 5 according to an embodiment of the present disclosure.
Figure 7:
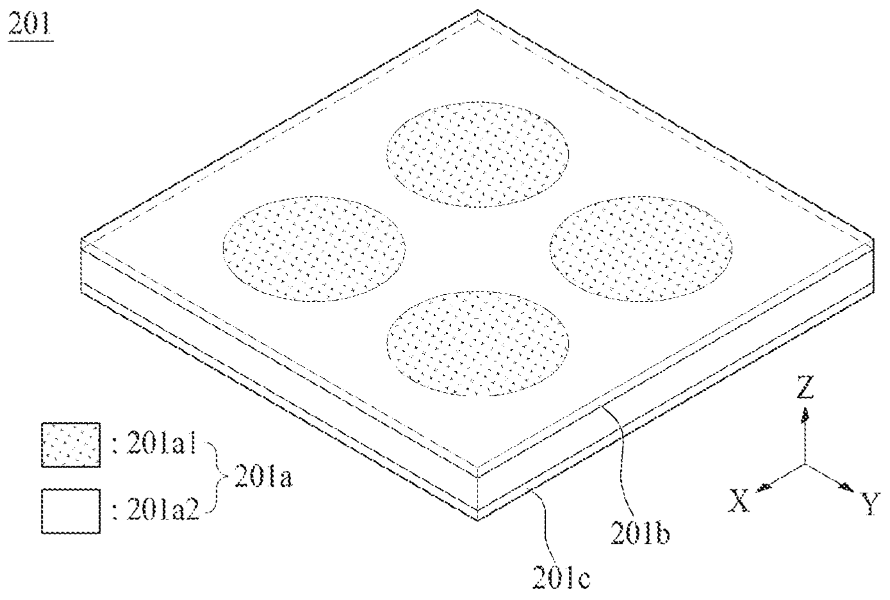
Figure 8:
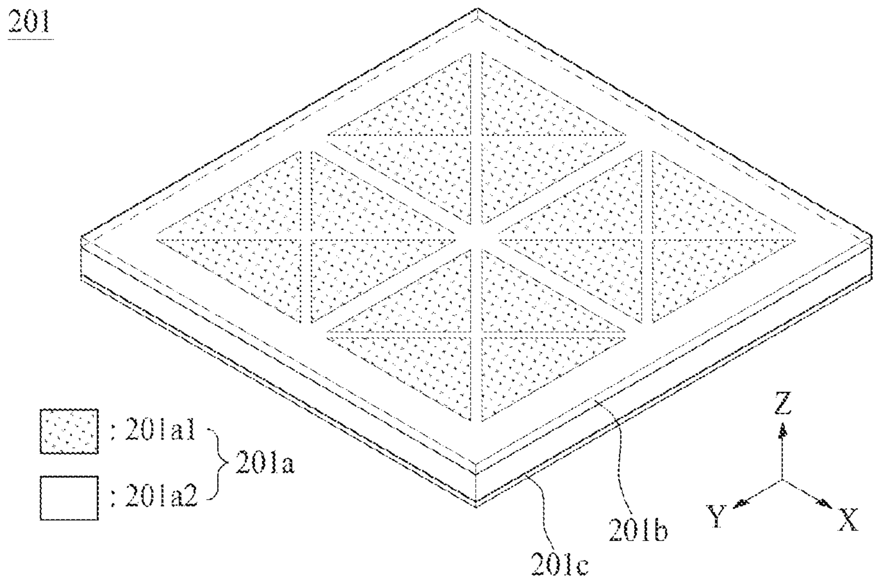

FIGS. 6 to 8 illustrate another embodiment of the vibration portion illustrated in FIG. 5 according to one embodiment.

With reference to FIG. 6, a vibration layer 201*a* of a vibration portion 201 according to another embodiment of the present disclosure may include a plurality of first portions 201*a*1, which are apart from one another in a first direction X and a second direction Y, and a second portion 201*a*2 disposed between the plurality of first portions 201*a*1.

The plurality of first portions 201*a*1 may be arranged apart from one another in each of the first direction X and the second direction Y. For example, the plurality of first portions 201*a*1 may be arranged in a lattice form to have a hexahedral shape having the same size. Each of the plurality of first portions 201*a*1 may include substantially the same piezoelectric material as that of the first portion 201*a*1 described above with reference to FIGS. 3 to 5, and thus, like reference numerals refer to like elements and repeated descriptions thereof are omitted.

The second portion 201*a*2 may be arranged between the plurality of first portions 201*a*1 in each of the first direction X and the second direction Y. The second portion 201*a*2 may be configured to fill a gap between two adjacent first portions 201*a*1 or surround each of the plurality of first portions 201*a*1, and thus, may be connected or adhered to an adjacent first portion 201*a*1. According to an embodiment of the present disclosure, a width of the second portion 201*a*2 disposed between two first portions 201*a*1 adjacent to each other in the first direction X may be the same as or different from that of the first portion 201*a*1, and a width of the second portion 201*a*2 disposed between two first portions 201*a*1 adjacent to each other in the second direction Y may be the same as or different from that of the first portion 201*al*. The second portion 201*a*2 may include substantially the same piezoelectric material as that of the second portion 201*a*2 described above with reference to FIGS. 3 to 5, and thus, like reference numerals refer to like elements and repeated descriptions thereof are omitted.

The vibration layer 201*a* according to another embodiment of the present disclosure may have a 1-3 composite structure having a piezoelectric characteristic of a 1-3 vibration mode, and thus, may have a resonance frequency of 30 MHz or less, but embodiments of the present disclosure are not limited thereto. For example, the resonance frequency of the vibration layer 201*a* may vary based on one or more of a shape, a length, and a thickness.

With reference to FIG. 7, a vibration layer 201*a* of a vibration portion 201 according to another embodiment of the present disclosure may include a plurality of first portions 201*al*, which are apart from one another in a first direction X and a second direction Y, and a second portion 201*a*2 disposed between the plurality of first portions 201*a*1.

Each of the plurality of first portions 201*a*1 may have a circular-shaped planar structure. For example, each of the plurality of first portions 201*a*1 may have a circular plate shape, but embodiments of the present disclosure are not limited thereto. For example, each of the plurality of first portions 201*a*1 may have a dot shape such as an oval shape, a polygonal shape, or a donut shape. Each of the plurality of first portions 201*a*1 may include substantially the same piezoelectric material as that of the first portion 201*a*1 described above with reference to FIGS. 3 to 5, and thus, like reference numerals refer to like elements and repeated descriptions thereof are omitted.

The second portion 201*a*2 may be arranged between the plurality of first portions 201*a*1 in each of the first direction X and the second direction Y. The second portion 201*a*2 may be configured to surround each of the plurality of first portions 201*a*1, and thus, may be connected or adhered to a lateral surface of each of the plurality of first portions 201*a*1. Each of the plurality of first portions 201*a*1 and the second portion 201*a*2 may be disposed (or arranged) in parallel on the same plane (or the same layer). The second portion 201*a*2 may include substantially the same organic material as that of the second portion 201*a*2 described above with reference to FIGS. 3 to 5, and thus, like reference numerals refer to like elements and repeated descriptions thereof are omitted.

With reference to FIG. 8, a vibration layer 201*a* of a vibration portion 201 according to another embodiment of the present disclosure may include a plurality of first portions 201*al*, which are apart from one another in a first direction X and a second direction Y, and a second portion 201*a*2 disposed between the plurality of first portions 201*a*1.

Each of the plurality of first portions 201*a*1 may have a triangular-shaped planar structure. For example, each of the plurality of first portions 201*a*1 may have a triangular plate shape. Each of the plurality of first portions 201*a*1 may include substantially the same piezoelectric material as that of the first portion 201*a*1 described above with reference to FIGS. 3 to 5, and thus, like reference numerals refer to like elements and repeated descriptions thereof are omitted.

According to an embodiment of the present disclosure, four adjacent first portions 201*a*1 of the plurality of first portions 201*a*1 may be arranged adjacent to one another to form a tetragonal shape (or a square shape). A vertex of each of the four adjacent first portions 201*a*1 forming a tetragonal shape may be disposed adjacent to a center portion (or a middle portion) of a tetragonal shape.

The second portion 201*a*2 may be arranged between the plurality of first portions 201*a*1 in each of the first direction X and the second direction Y. The second portion 201*a*2 may be configured to surround each of the plurality of first portions 201*a*1, and thus, may be connected or adhered to a lateral surface of each of the plurality of first portions 201*a*1. Each of the plurality of first portions 201*a*1 and the second portion 201*a*2 may be disposed (or arranged) in parallel on the same plane (or the same layer). The second portion 201*a*2 may include substantially the same organic material as that of the second portion 201*a*2 described above with reference to FIGS. 3 to 5, and thus, like reference numerals refer to like elements and repeated descriptions thereof are omitted.

According to another embodiment of the present disclosure, 2N (where N is a natural number of 2 or more) of adjacent first portions 201*a*1 among a plurality of first portions 201*a*1 having a triangular shape may be arranged adjacent to one another to form a 2N-angular shape. For example, six adjacent first portions 201*a*1 among the plurality of first portions 201*a*1 may be arranged adjacent to one another to form a hexagonal shape (or a regular hexagon). A vertex of each of six adjacent first portions 201*a*1 having a hexagonal shape may be disposed adjacent to a center portion (or a regular center portion) of a hexagonal shape. The second portion 201*a*2 may be provided to surround each of the plurality of first portions 201*a*1, and thus, may be connected with or attached on a lateral surface of each of the plurality of first portions 201*a*1. The plurality of first portions 201*a*1 and the second portion 201*a*2 may be disposed (or arranged) in parallel on the same plane (or the same layer).

Figure 9:
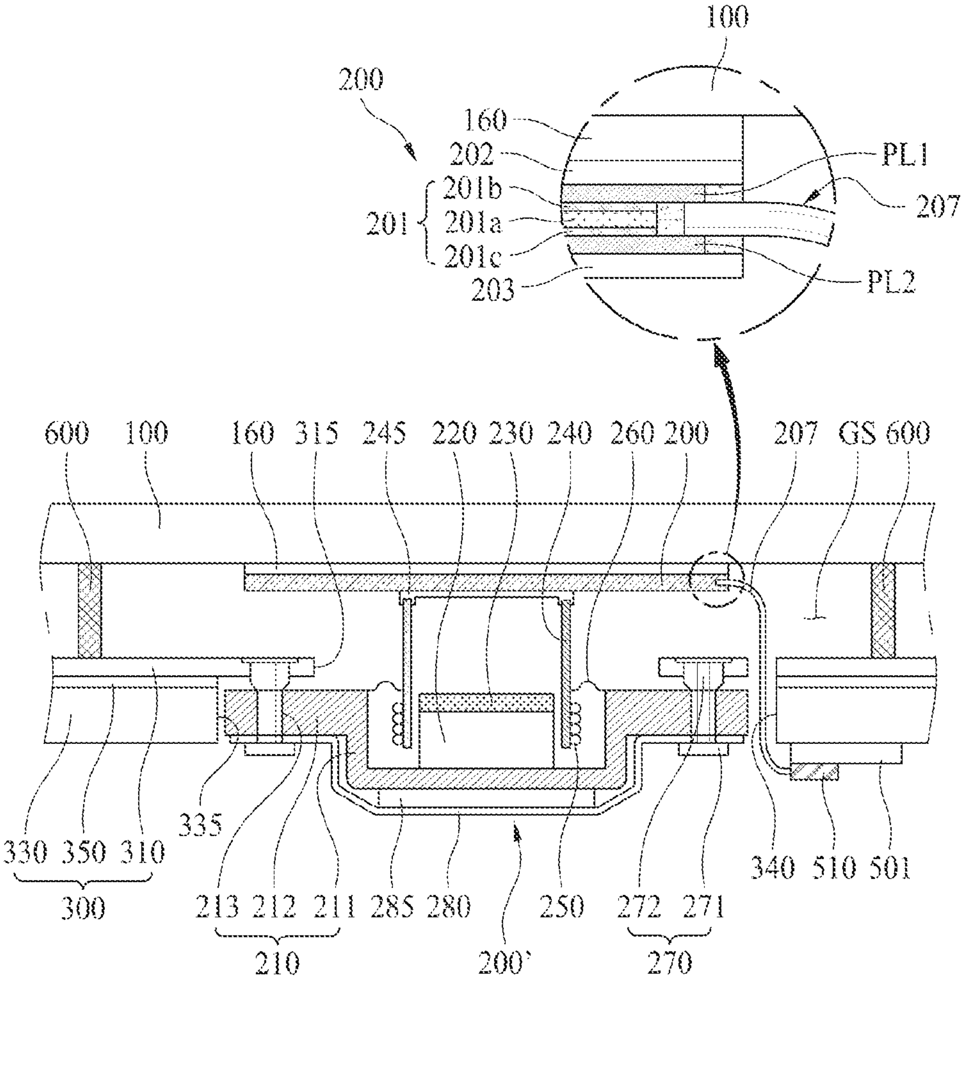
FIG. 9 illustrates a vibration apparatus according to an embodiment of the present disclosure.

FIG. 9 illustrates vibration apparatuses 200 and 200' according to an embodiment of the present disclosure.

Referring to FIG. 9, the vibration apparatuses 200 and 200' according to an embodiment of the present disclosure may include a first vibration apparatus 200 and a second vibration apparatus 200'.

The first vibration apparatus 200 may be disposed at a rear surface of a vibration member 100. The first vibration apparatus 200 may be connected with or coupled to the rear surface of the vibration member 100 by a connection member 160. The first vibration apparatus 200 may be implemented as a film type which is connected with or coupled to the rear surface of the vibration member 100 by the connection member 160.

The first vibration apparatus 200 may be referred to as a first sound generating module, a first sound generating apparatus, a first vibration generating apparatus, a first displacement apparatus, a first sound apparatus, a piezoelectric type vibration apparatus, a film actuator, a film type piezoelectric composite actuator, a film speaker, a film type piezoelectric speaker, or a film type piezoelectric composite speaker, which uses a piezoelectric device having a piezoelectric characteristic, but the terms are not limited thereto.

The connection member 160 may be disposed between the first vibration apparatus 200 and the vibration member 100 and may connect or couple the first vibration apparatus 200 to a vibration member 100. For example, the first vibration apparatus 200 may be connected with or coupled to the rear surface of the vibration member 100 by the connection member 160, and thus, may be supported by or disposed at the rear surface of the vibration member 100.

The second vibration apparatus 200' may be disposed between the vibration member 100 and a supporting member 300. The second vibration apparatus 200' may be adjacent to or contact a rear surface of the first vibration apparatus 200. The second vibration apparatus 200' may include a frame 210, a magnet 220, a center pole 230, a bobbin 240, and a coil 250.

The frame 210 may be fixed to the supporting member 300 to overlap through holes 315 and 335 (or a first hole) of the supporting member 300 and may support the magnet 220. The frame 210 may accommodate the magnet 220, the center pole 230, the bobbin 240, and the coil 250.

For example, the magnet 220 may be disposed on the frame 210. For example, the center pole 230 may be disposed on the frame 210. For example, the frame 210 may include a first frame 211 accommodating the magnet 220, the center pole 230, the bobbin 240, and the coil 250, and a second frame 212 which protrudes from an edge of the first frame 211. The first frame 211 and the second frame 212 may be provided as one body. For example, the first frame 211 and the second frame 212 may include a material such as iron (Fe), but embodiments of the present disclosure are not limited thereto. The first frame 211 and the second frame 212 may be referred to the other terms such as a yoke, but the terms are not limited thereto.

The first frame 211 may accommodate the magnet 220, the center pole 230, the bobbin 240, and the coil 250. For example, an inner portion of the first frame 211 may have a circular pillar shape, an oval pillar shape, or a cylinder shape. The magnet 220 may be disposed on the first frame 211, and the center pole 230 may be disposed on the magnet 220. The first frame 211 may support the magnet 220 and the center pole 230. The first frame 211 may be provided to surround the magnet 220 and the center pole 230 on the first frame 211 and the bobbin 240 and the coil 250 disposed around the center pole 230. For example, the coil 250 may be wound around an outer portion of the bobbin 240.

The second frame 212 may be formed to protrude from an edge of the first frame 211. The second frame 212 may be provided as one body with the first frame 211. For example, the second frame 212 may have a ring shape which surrounds the first frame 211. A coupling portion 213 fixed to the supporting member 300 may be formed at a portion of the second frame 212. The second frame 212 may be coupled to the supporting member 300 by the connection member 270 fastened to the coupling portion 213. For example, the connection member 270 may include a screw 271 and a nut 272. The nut 272 of the connection member 270 may be fixed to the supporting member 300. For example, the nut 272 may be fixed to the first supporting member 310. A portion of a rear surface of the first supporting member 310 may be exposed through a second through hole 335 of the second supporting member 330, and the nut 272 may be fixed to the rear surface of the first supporting member 310 exposed through the second through hole 335 of the second supporting member 330. The screw 271 of the connection member 270 may be fastened to the nut 272 fixed to the first supporting member 310 through the coupling portion 213, and thus, may couple the second frame 212 to the first supporting member 310. For example, the nut 272 may be a self-clinching nut. Accordingly, the vibration apparatus 200 may be fixed to the supporting member 300. For example, the self-clinching nut may be a PEM® nut, but embodiments of the present disclosure are not limited thereto.

The second vibration apparatus 200' according to an embodiment of the present disclosure may further include a frame cover 280 which covers a rear surface of the frame 210.

The frame cover 280 may be configured to surround the rear surface of the frame 210. For example, the frame cover 280 may be provided to surround the rear surface of the frame 210 and may dissipate heat occurring in driving of the second vibration apparatus 200'. The frame cover 280 may be provided to surround a rear surface of the first frame 211 and a rear surface of the second frame 212 of the frame 210. For example, the frame cover 280 may include a metal material, having high heat conductivity, such as aluminum (Al), copper (Cu), silver (Ag), or magnesium (Mg), or an alloy thereof, but embodiments of the present disclosure are not limited thereto.

A heat dissipation member 285 may be disposed at an inner surface of the frame cover 280. The heat dissipation member 285 may be disposed between the frame cover 280 and the rear surface of the frame 210. The heat dissipation member 285 may be disposed between the frame cover 280 and the rear surface of the first frame 211. For example, the heat dissipation member 285 may include a metal material, having high heat conductivity, such as aluminum (Al), copper (Cu), silver (Ag), or magnesium (Mg), or an alloy thereof, but embodiments of the present disclosure are not limited thereto.

The magnet 220 may be disposed on the frame 210. For example, the magnet 220 may be disposed on the first frame 211 of the frame 210. A lower end of the magnet 220 may be supported by the first frame 211, and a periphery of the magnet 220 may be surrounded thereby. The magnet 220 may be a permanent magnet having a ring shape, a cylindrical shape, or an oval shape. The magnet 220 may be implemented with a sintered magnet such as barium ferrite, and a material of the magnet 220 may include one or more of $Fe_2O_3$, $BaCO_3$, a neodymium magnet, strontium ferrite ($Fe_{12}O_{19}Sr$) with improved magnet component, an alloy cast magnet including aluminum (Al), nickel (Ni), and cobalt (Co). For example, the neodymium magnet may be neodymium-iron-boron (Nd—Fe—B).

The center pole 230 may be disposed on the magnet 220. The center pole 230 may be referred to as pole pieces. In another embodiment, the pole pieces may be further provided on the center pole 230.

The bobbin 240 may surround a periphery of the magnet 220. For example, the bobbin 240 may surround the magnet 220 and the center pole 230. The bobbin 240 may be disposed on the frame 210. For example, the bobbin 240 may be disposed on the first frame 211 of the frame 210. The bobbin 240 may be accommodated into the first frame 211. The bobbin 240 may be surrounded by the first frame 211. For example, the bobbin 240 may be disposed between the magnet 220 and the first frame 211.

The bobbin 240 may be adjacent to or contact a rear surface of the first vibration apparatus 200. The bobbin 240 may be attached on the rear surface of the first vibration apparatus 200. The bobbin 240 may be attached on the rear surface of the first vibration apparatus 200 through a bobbin ring 245. For example, when a current or a voice signal for generating a sound is applied to the coil 250 wound around an outer circumference surface of the bobbin 240, a whole portion of the bobbin 240 may move (or vibrate) upward and downward according to Fleming's left-hand rule based on an application magnetic field generated around the coil 250 and an external magnetic field generated around the magnet 220. The vertical movement (or vibration) of the bobbin 240 may directly or indirectly vibrate the vibration member 100. For example, the bobbin 240 may vibrate the first vibration apparatus 200 or the vibration member 100 by using the bobbin ring 245. The bobbin 240 may directly vibrate the first vibration apparatus 200 or the vibration member 100. Alternatively, a vibration of the bobbin 240 may be transferred to the vibration member 100 through the first vibration apparatus 200. Also, the vibration member 100 may directly or indirectly receive a vibration from the bobbin 240 or the bobbin ring 245 to generate a sound or a sound wave, and the generated sound or sound wave may be output in a forward direction of the vibration member 100.

The damper 260 may be disposed between the first frame 211 and the bobbin 240. For example, one end (or one side) of the damper 260 may be connected with the first frame 211, and the other end (or the other side) of the damper 260 may be connected with the bobbin 240. The damper 260 may be provided in a structure which is creased between the one end and the other end thereof, and thus, may be contracted and relaxed based on a vibration of the bobbin 240 and may adjust and guide a vibration of the bobbin 240, based on a rectilinear reciprocating motion. Therefore, the damper 260 may be connected between the first frame 211 and the bobbin 240, and thus, may limit a vibration distance of the bobbin 240 by using a restoring force. For example, when the bobbin 240 moves by a certain distance or more or vibrates by a certain distance or less, the bobbin 240 may be restored to an original position with the restoring force of the damper 260. For example, the damper 260 may be referred to as other term such as an edge, a spider, or a suspension, but the terms are not limited thereto.

The bobbin ring 245 may be disposed between the bobbin 240 and the first vibration apparatus 200 and may transfer a vibration of the bobbin 240 to the first vibration apparatus 200 or the vibration member 100. The bobbin ring 245 may be disposed in all of the bobbin 240, but embodiments of the present disclosure are not limited thereto and the bobbin ring 245 may be disposed at a position at which the bobbin 240 is disposed. The bobbin ring 245 may be attached on the rear surface of the first vibration apparatus 200 by an adhesive member. For example, the adhesive member may be a double-sided tape, a single-sided tape, an adhesive, or a bond, but embodiments of the present disclosure are not limited thereto. For example, the bobbin ring 245 may prevent heat occurring in the bobbin 240 from being transferred to the first vibration apparatus 200 or the vibration member 100 and may efficiently transfer a vibration of the bobbin 240 to the first vibration apparatus 200 or the vibration member 100.

In the apparatus according to an embodiment of the present disclosure, the first vibration apparatus 200 between the vibration member 100 and the second vibration apparatus 200' may reduce or decrease heat occurring when the second vibration apparatus 200' is vibrating. For example, the first vibration apparatus 200 may prevent or reduce the transfer of heat, occurring in the second vibration apparatus 200', to the vibration member 100. The first vibration apparatus 200 may be configured to cover the second vibration apparatus 200' or to have a size which is greater than that of the second vibration apparatus 200'. For example, the first vibration apparatus 200 may contact the bobbin 240 of the second vibration apparatus 200'. The first vibration apparatus 200 may contact the bobbin ring 245 of the second vibration apparatus 200'. The first vibration apparatus 200 may have a size which is greater than that of the bobbin 240 or the bobbin ring 245 of the second vibration apparatus 200' contacting the first vibration apparatus 200. Therefore, in the apparatus according to an embodiment of the present disclosure, the first vibration apparatus 200 between the vibration member 100 and the second vibration apparatus 200' may further perform a function of preventing or reducing the transfer of heat, occurring in the second vibration apparatus 200', to the vibration member 100, and thus, an adverse effect of heat occurring when the second vibration apparatus 200' is vibrating may be reduced on the display panel or the vibration member 100 or the image quality of the display panel. For example, the first vibration apparatus 200 may be attached on the second vibration apparatus 200' by an adhesive member. The adhesive member may be a double-sided tape, a single-sided tape, an adhesive, or a bond, but embodiments of the present disclosure are not limited thereto. For example, the adhesive member may be disposed between the first vibration apparatus 200 and the bobbin 240 or the bobbin ring 245.

A gap space GS (or an internal space) may be provided between the vibration member 100 and the supporting member 300. A partition member 600 providing or limiting the gap space GS may be further provided between the vibration member 100 and the supporting member 300.

The partition member 600 may provide or define the gap space GS which generates a sound when the vibration member 100 is vibrated by the vibration apparatus 200 and 200'. The partition member 600 may separate the sound generated by the vibration member 100, or may separate a channel, and thus, may prevent or decrease interference of the sound. The partition member 600 may be referred to as an enclosure or a baffle, but the terms are not limited thereto.

The partition member 600 may divide or provide a gap space GS (or an internal space) corresponding to the vibration apparatus 200 and 200'. For example, the partition member 600 may be provided to surround a periphery of the vibration apparatus 200 and 200'. The partition member 600 may include four sides surrounding the vibration apparatus 200 and 200'. For example, the partition member 600 may be implemented in a structure where the four sides are provided as one body, and thus, may be configured in a structure which seals the gap space GS between the vibration member 100 and the supporting member 300 at a periphery of the vibration apparatus 200 and 200'. As another example, the partition member 600 may include a plurality of open portions which are provided at one or more of the four sides, and thus, may be configured in a structure which does not seal the gap space GS between the vibration member 100 and the supporting member 300 at the periphery of the vibration apparatus 200 and 200'.

According to an embodiment of the present disclosure, the partition member 600 may include a material capable of absorbing a vibration or controlling a vibration. The partition member 600 may include a single-sided tape, a single-sided foam tape, a single-sided foam pad, a double-sided foam tape, a double-sided foam pad, or a double-sided tape, but embodiments of the present disclosure are not limited thereto. For example, the partition member 600 may include one or more materials of a silicone-based polymer, paraffin wax, a urethane-based polymer, and an acrylic-based polymer. For example, the partition member 600 may include a urethane-based material (or substance) having a relatively ductile characteristic among acryl and urethane, so as to minimize the transfer of a vibration of the vibration member 100 to the supporting member 300.

The apparatus according to an embodiment of the present disclosure may further include a control board 501 which controls the first vibration apparatus 200 and the second vibration apparatus 200'.

The control board 501 may include a sound processing circuit which generates a vibration driving signal (or a vibration signal or a sound signal or a voice signal) for controlling vibration driving or driving of the first vibration apparatus 200 and the second vibration apparatus 200'. For example, the sound processing circuit may generate an alternating current (AC) vibration driving signal including a first vibration driving signal and a second vibration driving signal, based on sound data provided from an external sound data generating circuit unit. For example, the sound processing circuit may be referred to as an audio circuit, an audio amplifier circuit, an audio amplifier, or an audio amplifier unit, but embodiments of the present disclosure are not limited thereto.

The control board 501 may be implemented as a printed circuit board (PCB) with the sound processing circuit mounted thereon. The control board 501 may be disposed at the rear surface of the supporting member 300. For example, the control board 501 may be attached on the rear surface of the supporting member 300.

According to an embodiment of the present disclosure, the control board 501 may be connected with the first vibration apparatus 200 and the second vibration apparatus 200' through different signal paths. Different signal paths may include a first signal path and a second signal path that is different from the first signal path. For example, the first vibration apparatus 200 may be connected with the control board 501 through the first signal path and the second vibration apparatus 200' may be connected with the control board 501 through the second signal path. The control board 501 may be connected with each of the first vibration apparatus 200 and the second vibration apparatus 200' through different signal paths. The control board 501 may respectively apply different vibration driving signals to the first vibration apparatus 200 and the second vibration apparatus 200' through different signal paths, and thus, the first vibration apparatus 200 and the second vibration apparatus 200' may be individually driven or vibration-driven. For example, the first vibration apparatus 200 and the second vibration apparatus 200' may be individually driven or vibration-driven based on different vibration driving signals. For example, when a desired sound has the first pitched sound band (or the high pitched sound band or the middle-high pitched sound band), the control board 501 may apply a vibration driving signal to the first vibration apparatus 200 and may not apply a vibration driving signal to the second vibration apparatus 200'. As another example, when a desired sound has the second pitched sound band (or the low pitched sound band or the middle-low pitched sound band), the control board 501 may apply a vibration driving signal to the second vibration apparatus 200' and may not apply a vibration driving signal to the first vibration apparatus 200. As another example, the control board 501 may be individually provided in each of the first vibration apparatus 200 and the second vibration apparatus 200'. For example, the control board 501 may include a first control board for control of the first vibration apparatus 200 and a second control board for control of the second vibration apparatus 200'. The first control board and the second control board of the control board 501 may be configured to individually control the first vibration apparatus 200 and the second vibration apparatus 200'.

The control board 501 may include a signal connector 510 which applies a vibration driving signal to the first vibration apparatus 200 and the second vibration apparatus 200'. The signal connector 510 may be connected with the first vibration apparatus 200 and the second vibration apparatus 200' in common. Alternatively, the signal connector 510 may be individually provided in each of the first vibration apparatus 200 and the second vibration apparatus 200'. For example, the signal connector 510 may include a first signal connector connected with the first vibration apparatus 200 and a second signal connector connected with the second vibration apparatus 200'.

The control board 501 may be electrically connected with the first vibration apparatus 200 and the second vibration apparatus 200' through a signal connection member 207 connected with the signal connector 510. For example, the signal connection member 207 may include at least one of a signal cable, a probe pin, and a pogo pin.

The supporting member 300 according to an embodiment of the present disclosure, as illustrated in FIG. 9, may include a first contact hole 340 through which the signal connection member 207 connecting the first vibration apparatus 200 with the signal connector 510 of the control board 501 passes. For example, the first contact hole 340 may be punched in a predetermined partial region of the supporting member 300 in a thickness direction Z of the supporting member 300 so that the signal connection member 207 passes through a region between an outer portion and an inner portion of the supporting member 300. That is, a portion of the signal connection member 207 is disposed in the first contact hole 340. The first contact hole 340 may be provided in the supporting member 300 which does not overlap the second vibration apparatus 200'. The first vibration apparatus 200 may be electrically connected with the signal connector 510 of the control board 501 through the signal connection member 207 passing through the first contact hole 340 of the supporting member 300. For example, the signal connection member 207 may be an element which is the same as or similar to the signal connection member 207 described above with reference to FIG. 3.

One end (or one side) of the signal connection member 207 may be connected with the first vibration apparatus 200, and the other end (or the other side) of the signal connection member 207 may be connected with the signal connector 510 of the control board 501. For example, the signal connection member 207 may be connected with each of first and second power supply lines PL1 and PL2 or first and second electrode layers 201*b* and 201*c* of the first vibration apparatus 200.

The signal connection member 207, as illustrated in FIG. 9, may be inserted or accommodated into the first vibration apparatus 200 and may be connected with each of the first and second power supply lines PL1 and PL2 of the first vibration apparatus 200. The signal connection member 207 may be disposed between the first and second power supply lines PL1 and PL2 of the first vibration apparatus 200. For example, one surface (or an upper surface) of the signal connection member 207 may contact the first power supply line PL1 connected with the first electrode layer 201*b*, and the other surface (or a lower surface) of the signal connection member 207 may contact the second power supply line PL2 connected with the second electrode layer 201*c*.

Figure 10:
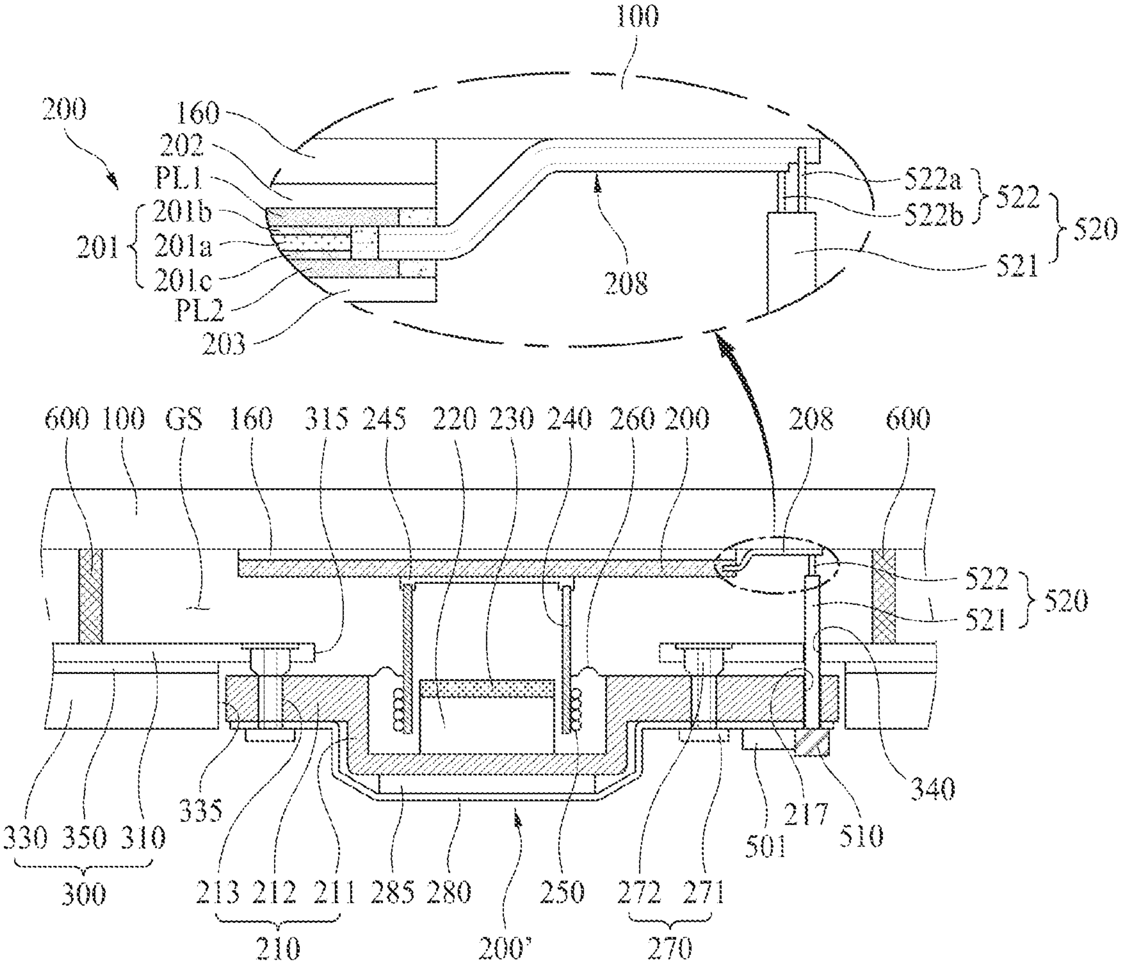
FIGS. 10 and 11 illustrate another embodiment of the vibration apparatus illustrated in FIG. 9 according to an embodiment of the present disclosure.
Figure 11:
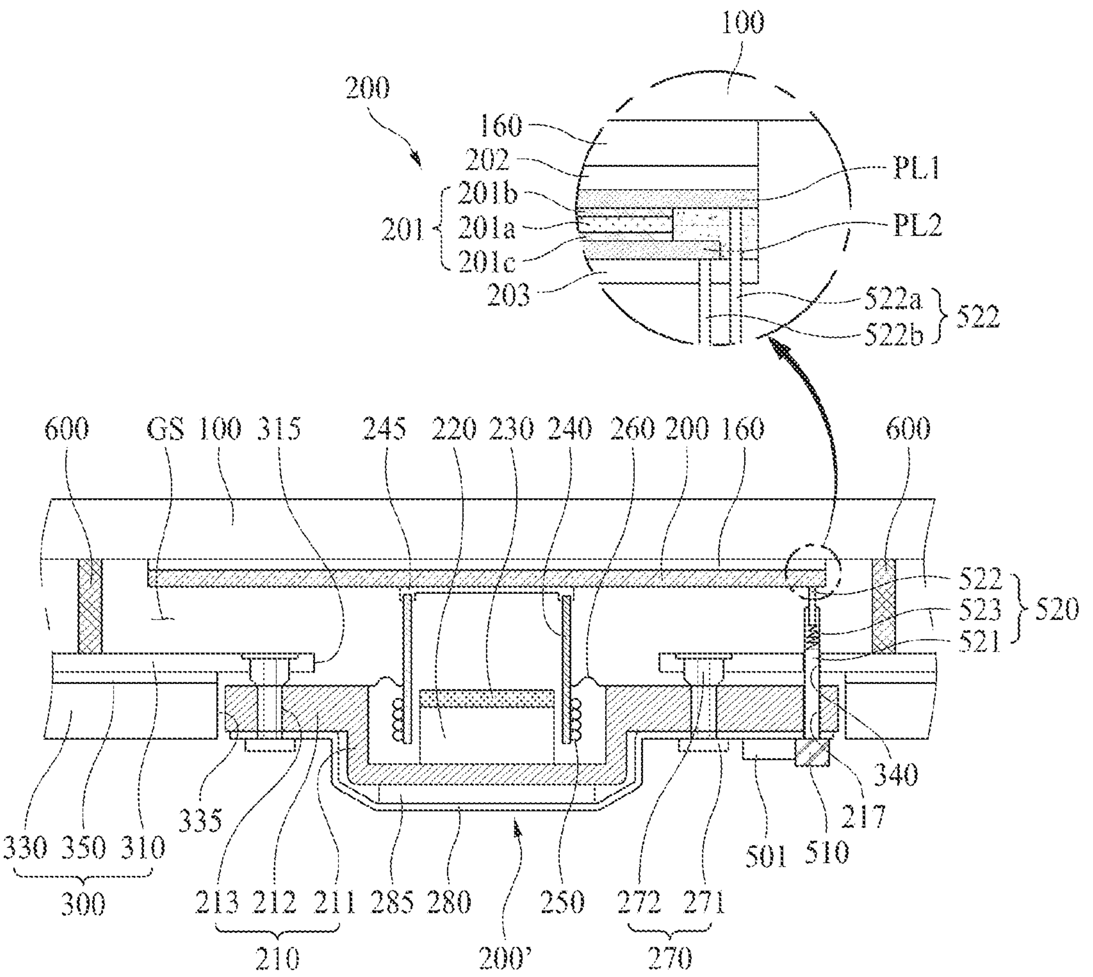

FIGS. 10 and 11 illustrate another embodiment of the vibration apparatus illustrated in FIG. 9. FIGS. 10 and 11 illustrate an embodiment implemented by modifying configurations of the control board and the signal connection member illustrated in FIG. 9. Therefore, repeated descriptions of the same elements other than modified configurations of a control board and a signal connection member and relevant elements are omitted or will be briefly described below.

Referring to FIG. 10, in vibration apparatuses 200 and 200' according to another embodiment of the present disclosure, a control board 501 which controls a first vibration apparatus 200 and a second vibration apparatus 200' may be disposed at a rear surface of the second vibration apparatus 200'. Also, the vibration apparatuses 200 and 200' may further include a signal connection member 520 which is connected with a signal connector 510 of the control board 501 and the first vibration apparatus 200.

The control board 501 may be implemented as a PCB with a sound processing circuit mounted thereon. The control board 501 may be disposed at the rear surface of the second vibration apparatus 200'. For example, the control board 501 may be attached on the rear surface of the second vibration apparatus 200'. The control board 501 may be attached on a rear surface of a frame 210 of the second vibration apparatus 200'. The control board 501 may be attached on a rear surface of a second frame 212 of the frame 210.

According to another embodiment of the present disclosure, the control board 501 may be connected with the first vibration apparatus 200 and the second vibration apparatus 200' through the same signal path. The control board 501 may apply the same vibration driving signal to the first vibration apparatus 200 and the second vibration apparatus 200' through the same signal path, and thus, the first vibration apparatus 200 and the second vibration apparatus 200' may be simultaneously driven or vibration-driven. For example, when a desired sound has the first pitched sound band (or the high pitched sound band or the middle-high pitched sound band), the control board 501 may generate a vibration driving signal suitable or optimized for driving or vibration driving of the first vibration apparatus 200 and may apply the generated vibration driving signal to the first vibration apparatus 200 and the second vibration apparatus 200'. As another example, when a desired sound has the second pitched sound band (or the low pitched sound band or the middle-low pitched sound band), the control board 501 may generate a vibration driving signal suitable or optimized for driving or vibration driving of the second vibration apparatus 200' and may apply the generated vibration driving signal to the first vibration apparatus 200 and the second vibration apparatus 200'.

The control board 501 may include a signal connector 510 which applies a vibration driving signal to the first vibration apparatus 200 and the second vibration apparatus 200'. The signal connector 510 may be connected with the first vibration apparatus 200 and the second vibration apparatus 200' in common.

The control board 501 may be electrically connected with the first vibration apparatus 200 and the second vibration apparatus 200' through a signal connection member 520 connected with the signal connector 510. For example, the signal connection member 520 may include at least one of a signal cable, a probe pin, and a pogo pin.

The supporting member 300 according to another embodiment of the present disclosure, as illustrated in FIG. 10, may include a first contact hole 340 through which the signal connection member 520 connecting the first vibration apparatus 200 with the signal connector 510 of the control board 501 passes. For example, the first contact hole 340 may be punched in a predetermined partial region of the supporting member 300 in a thickness direction Z of the supporting member 300 so that the signal connection member 520 passes through a region between an outer portion and an inner portion of the supporting member 300. The first contact hole 340 may be provided in the supporting member 300 overlapping the second vibration apparatus 200'. For example, the first contact hole 340 may be provided in a first supporting member 310 of the supporting member 300. The first contact hole 340 may be formed in the first supporting member 310 exposed through a second through hole 335 of a second supporting member 330.

The second vibration apparatus 200' may include a second contact hole 217 which overlaps the first contact hole 340 of the supporting member 300. The second contact hole 217 may be formed in a frame 210 of the second vibration apparatus 200'. The second contact hole 217 may be provided in a second frame 212 of the frame 210. The first contact hole 340 of the supporting member 300 and the second contact hole 217 of the second vibration apparatus 200' may overlap each other to provide a path through which the signal connection member 520 passes. The first vibration apparatus 200 may be electrically connected with the signal connector 510 of the control board 501 through the signal connection member 520 passing through the first contact hole 340 of the supporting member 300 and the second contact hole 217 of the second vibration apparatus 200'. That is a portion of the signal connection member 520 is disposed in the first contact hole 340 and another portion of the signal connection member 520 is disposed in the second contact hole 217.

The signal connection member 520 may include a body portion 521 and a contact portion 522. The body portion 521 of the signal connection member 520 may be connected with the signal connector 510, and the contact portion 522 of the signal connection member 520 may be connected with the first vibration apparatus 200. For example, the signal connection member 520 may be configured with a probe pin. For example, the first vibration apparatus 200 may include a signal connection member 520 which is connected with each of first and second power supply lines PL1 and PL2 or first and second electrode layers 201*b* and 201*c* thereof. Also, the signal connection member 520 may be connected with a signal contact pad 208 of the first vibration apparatus 200.

The signal contact pad 208, as illustrated in FIG. 10, may be inserted or accommodated into the first vibration apparatus 200 and may be connected with each of the first and second power supply lines PL1 and PL2 of the first vibration apparatus 200. The signal contact pad 208 may be disposed between the first and second power supply lines PL1 and PL2 of the first vibration apparatus 200. For example, one surface (or an upper surface) of the signal contact pad 208 may contact the first power supply line PL1 connected with the first electrode layer 201*b*, and the other surface (or a lower surface) of the signal contact pad 208 may contact the second power supply line PL2 connected with the second electrode layer 201*c*.

In the signal connection member 520, as illustrated in FIG. 10, the contact portion 522 of the signal connection member 520 may include a first contact portion 522*a* and a second contact portion 522*b*. The signal connection member 520 may contact and be electrically connected with the signal contact pad 208 connected with the first vibration apparatus 200. For example, the first contact portion 522*a* may contact one surface (or an upper surface) of the signal contact pad 208 connected with the first electrode layer 201*b*, and the second contact portion 522*b* may contact the other surface (or a lower surface) of the signal contact pad 208 connected with the second electrode layer 201*c*.

Referring to FIG. 11, in vibration apparatuses 200 and 200' according to another embodiment of the present disclosure, a control board 501 which controls a first vibration apparatus 200 and a second vibration apparatus 200' may be disposed at a rear surface of the second vibration apparatus 200'. Also, the vibration apparatuses 200 and 200' may further include a signal connection member 520 which is connected with a signal connector 510 of the control board 501 and the first vibration apparatus 200.

The control board 501 may be implemented as a PCB with a sound processing circuit mounted thereon. The control board 501 may be disposed at the rear surface of the second vibration apparatus 200'. For example, the control board 501 may be attached on the rear surface of the second vibration apparatus 200'. The control board 501 may be attached on a rear surface of a frame 210 of the second vibration apparatus 200'. The control board 501 may be attached on a rear surface of a second frame 212 of the frame 210.

According to another embodiment of the present disclosure, the control board 501 may be connected with the first vibration apparatus 200 and the second vibration apparatus 200' through the same signal path.

The control board 501 may include a signal connector 510 which applies a vibration driving signal to the first vibration apparatus 200 and the second vibration apparatus 200'. The signal connector 510 may be connected with the first vibration apparatus 200 and the second vibration apparatus 200' in common.

The control board 501 may be electrically connected with the first vibration apparatus 200 and the second vibration apparatus 200' through a signal connection member 520 connected with the signal connector 510. For example, the signal connection member 520 may include at least one of a signal cable, a probe pin, and a pogo pin.

The supporting member 300 according to another embodiment of the present disclosure, as illustrated in FIG. 10, may include a first contact hole 340 through which the signal connection member 520 connecting the first vibration apparatus 200 with the signal connector 510 of the control board 501 passes. Also, the second vibration apparatus 200' may include a second contact hole 217 which overlaps the first contact hole 340 of the supporting member 300. The first contact hole 340 of the supporting member 300 and the second contact hole 217 of the second vibration apparatus 200' may be provided to overlap at least a portion of the first vibration apparatus 200. The first vibration apparatus 200 may be electrically connected with the signal connector 510 of the control board 501 through the signal connection member 520 passing through the first contact hole 340 of the supporting member 300 and the second contact hole 217 of the second vibration apparatus 200'. That is, the signal connection member 520 includes a portion that is disposed in the first contact hole 340 and another portion that is disposed in the second contact hole 217.

The signal connection member 520 may include a body portion 521, a contact portion 522, and an elastic portion 523. For example, the elastic portion 523 may be accommodated in an inner portion of the body portion 521, and the contact portion 522 may contact one end of the elastic portion 523. The contact portion 522 of the signal connection member 520 may be configured so that a certain portion thereof is moved by expansion and/or contraction of the elastic portion 523. The body portion 521 of the signal connection member 520 may be connected with the signal connector 510, and the contact portion 522 of the signal connection member 520 where a certain portion thereof is movable by the elastic portion 523 may be connected with the first vibration apparatus 200. For example, the signal connection member 520 may be configured as a pogo pin. For example, the signal connection member 520 may directly contact each of first and second power supply lines PL1 and PL2 or first and second electrode layers 201*b* and 201*c* of the first vibration apparatus 200.

As illustrated in FIG. 11, a portion of each of the first and second power supply lines PL1 and PL2 of the first vibration apparatus 200 may be provided to be exposed at the outside. The signal connection member 520 may be connected with each of the first and second power supply lines PL1 and PL2 through an exposed portion of each of the first and second power supply lines PL1 and PL2. For example, the first vibration apparatus 200 may be configured so that a portion of a lower surface of each of the first and second power supply lines PL1 and PL2 is exposed.

In the signal connection member 520, as illustrated in FIG. 11, the contact portion 522 of the signal connection member 520 may include a first contact portion 522*a* and a second contact portion 522*b*. The signal connection member 520 may contact and be electrically connected with each of the first and second power supply lines PL1 and PL2 where a portion thereof is exposed, in the first vibration apparatus 200. For example, the first contact portion 522*a* may contact an exposed lower surface of the first power supply line PL1 connected with the first electrode layer 201*b*, and the second contact portion 522*b* may contact an exposed lower surface of the second power supply line PL2 connected with the second electrode layer 201*c*.

Figure 12:
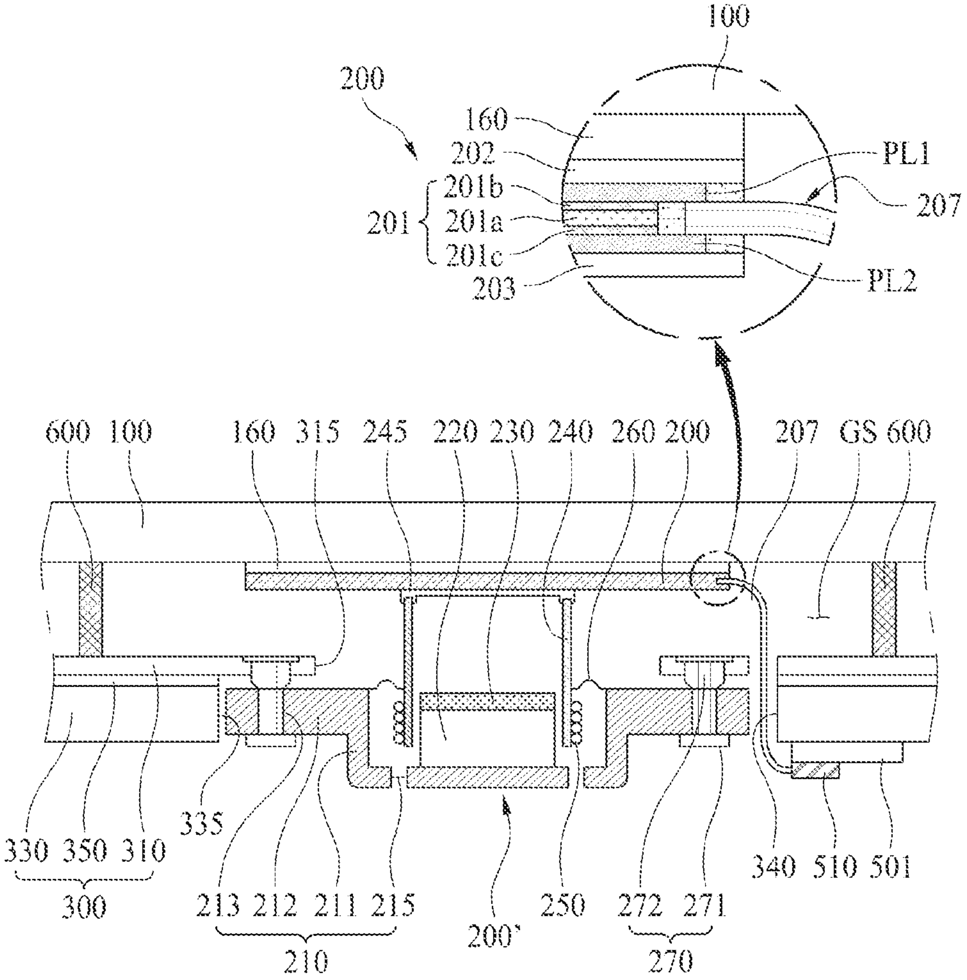
FIG. 12 illustrates a vibration apparatus according to another embodiment of the present disclosure.

FIG. 12 illustrates vibration apparatuses 200 and 200' according to another embodiment of the present disclosure. FIG. 12 illustrates an embodiment implemented by modifying a structure of the vibration apparatus described above with reference to FIGS. 9 to 11. Therefore, repeated descriptions of the same elements other than a modified configuration of a vibration apparatus and relevant elements are omitted or will be briefly described below.

Referring to FIG. 12, the vibration apparatuses 200 and 200' according to an embodiment of the present disclosure may include a first vibration apparatus 200 and a second vibration apparatus 200'.

The first vibration apparatus 200 may be disposed at a rear surface of a vibration member 100. The first vibration apparatus 200 may be connected with or coupled to the rear surface of the vibration member 100 by a connection member 160.

The second vibration apparatus 200' may be disposed between the vibration member 100 and a supporting member 300. The second vibration apparatus 200' may be adjacent to or contact a rear surface of the first vibration apparatus 200. The second vibration apparatus 200' may include a frame 210, a magnet 220, a center pole 230, a bobbin 240, and a coil 250.

The frame 210 may be fixed to the supporting member 300 to overlap through holes 315 and 335 (or a first hole) of the supporting member 300 and may support the magnet 220. The frame 210 may accommodate the magnet 220, the center pole 230, the bobbin 240, and the coil 250. The frame 210 may include a thermal conductive material. The frame 210 may include a first frame 211, accommodating the magnet 220, the center pole 230, the bobbin 240, and the coil 250, and a second frame 212 which protrudes from an edge of the first frame 211. The first frame 211 and the second frame 212 may be provided as one body. The first frame 211 and the second frame 212 may include the same material having heat conductivity and may be provided as one body. For example, the first frame 211 and the second frame 212 may include a material such as iron (Fe), but embodiments of the present disclosure are not limited thereto. The first frame 211 and the second frame 212 may be referred to the other terms such as a yoke, but the terms are not limited thereto.

According to another embodiment of the present disclosure, the first frame 211 may further include a plurality of air penetration holes 215 (or second hole).

The plurality of air penetration holes 215 (or second hole) may provide a path which enables an inner portion of the first frame 211, into which the bobbin 240 and the coil 250 are accommodated, to be connected or communicate with the outside. For example, the plurality of air penetration holes 215 may be formed to pass through or vertically pass through the first frame 211. The plurality of air penetration holes 215 (or second hole) may be formed in a portion overlapping each of the through holes 315 and 335 (or first hole) of the supporting member 300. For example, the plurality of air penetration holes 215 may be formed to pass through or vertically pass through the first frame 211 overlapping the through holes 315 and 335 of the supporting member 300. Therefore, the gap space GS (or internal space) between the vibration member 100 and the supporting member 300 or the inner portion of the first frame 211 may communicate with the outside through the through holes 315 and 335 of the supporting member 300 and the plurality of penetration holes 215. For example, the plurality of air penetration holes 215 may connect or communicate the gap space GS between the vibration member 100 and the supporting member 300 with the outside through the through holes 315 and 335 of the supporting member 300. Each of the plurality of air penetration holes 215 may be formed in one shape of a circular shape, an oval shape, and a slit shape, but embodiments of the present disclosure are not limited thereto.

The plurality of air penetration holes 215 (or second hole) may be configured to discharge heat, occurring in the bobbin 240 and the coil 250 accommodated into the first frame 211, to the outside. The plurality of air penetration holes 215 may be provided in a portion overlapping each of the bobbin 240 and the coil 250 accommodated into the first frame 211. For example, the plurality of air penetration holes 215 may be formed to pass through or vertically pass through the portion overlapping each of the bobbin 240 and the coil 250. The plurality of air penetration holes 215 may be arranged at a certain interval. For example, the plurality of air penetration holes 215 may be arranged at a certain interval in a circumference direction of each of the bobbin 240 and the coil 250 accommodated into the first frame 211. A center portion of each of the plurality of air penetration holes 215 may overlap the bobbin 240 and the coil 250. A size (or diameter) of each of the plurality of air penetration holes 215 may be greater than or equal to a thickness of each of the bobbin 240 and the coil 250. However, embodiments of the present disclosure are not limited to the shape or arrangement of the plurality of air penetration holes 215.

The magnet 220 may be disposed on the frame 210. For example, the magnet 220 may be disposed on the first frame 211 of the frame 210. A lower end of the magnet 220 may be supported by the first frame 211, and a periphery of the magnet 220 may be surrounded thereby. The magnet 220 may be disposed at a center of the inner portion of the first frame 211, and the plurality of air penetration holes 215 apart from the magnet 220 may be formed therein. The plurality of air penetration holes 215 may be formed apart from one another by a certain interval along the periphery of the magnet 220. The plurality of air penetration holes 215 may be formed not to overlap the magnet 220.

The apparatus according to another embodiment of the present disclosure may further include a control board 501 which controls the first vibration apparatus 200 and the second vibration apparatus 200'.

The control board 501 may include a sound processing circuit which generates a vibration driving signal (or a vibration signal or a sound signal or a voice signal) for controlling vibration driving or driving of the first vibration apparatus 200 and the second vibration apparatus 200'.

The control board 501 may be implemented as a PCB with the sound processing circuit mounted thereon. The control board 501 may be disposed at the rear surface of the supporting member 300. For example, the control board 501 may be attached on the rear surface of the supporting member 300.

According to another embodiment of the present disclosure, the control board 501 may be connected with the first vibration apparatus 200 and the second vibration apparatus 200' through different signal paths. The control board 501 may respectively apply different vibration driving signals to the first vibration apparatus 200 and the second vibration apparatus 200' through different signal paths, and thus, the first vibration apparatus 200 and the second vibration apparatus 200' may be individually driven or vibration-driven.

The control board 501 may include a signal connector 510 which applies a vibration driving signal to the first vibration apparatus 200 and the second vibration apparatus 200'.

The control board 501 may be electrically connected with the first vibration apparatus 200 and the second vibration apparatus 200' through a signal connection member 207 connected with the signal connector 510. For example, the signal connection member 207 may include at least one of a signal cable, a probe pin, and a pogo pin.

The supporting member 300 according to another embodiment of the present disclosure, as illustrated in FIG. 12, may include a first contact hole 340 through which the signal connection member 207 connecting the first vibration apparatus 200 with the signal connector 510 of the control board 501 passes. For example, the first contact hole 340 may be punched in a predetermined partial region of the supporting member 300 in a thickness direction Z of the supporting member 300 so that the signal connection member 207 passes through a region between an outer portion and an inner portion of the supporting member 300. The first contact hole 340 may be provided in the supporting member 300 which does not overlap the second vibration apparatus 200'. The first vibration apparatus 200 may be electrically connected with the signal connector 510 of the control board 501 through the signal connection member 207 passing through the first contact hole 340 of the supporting member 300. For example, the signal connection member 207 may be an element which is the same as or similar to the signal connection member 207 described above with reference to FIG. 3. One end (or one side) of the signal connection member 207 may be connected with the first vibration apparatus 200, and the other end (or the other side) of the signal connection member 207 may be connected with the signal connector 510 of the control board 501. For example, the signal connection member 207 may be connected with each of first and second power supply lines PL1 and PL2 or first and second electrode layers 201*b* and 201*c* of the first vibration apparatus 200.

The signal connection member 207, as illustrated in FIG. 12, may be inserted or accommodated into the first vibration apparatus 200 and may be connected with each of the first and second power supply lines PL1 and PL2 of the first vibration apparatus 200. The signal connection member 207 may be disposed between the first and second power supply lines PL1 and PL2 of the first vibration apparatus 200. For example, one surface (or an upper surface) of the signal connection member 207 may contact the first power supply line PL1 connected with the first electrode layer 201*b*, and the other surface (or a lower surface) of the signal connection member 207 may contact the second power supply line PL2 connected with the second electrode layer 201*c*.

Figure 13:
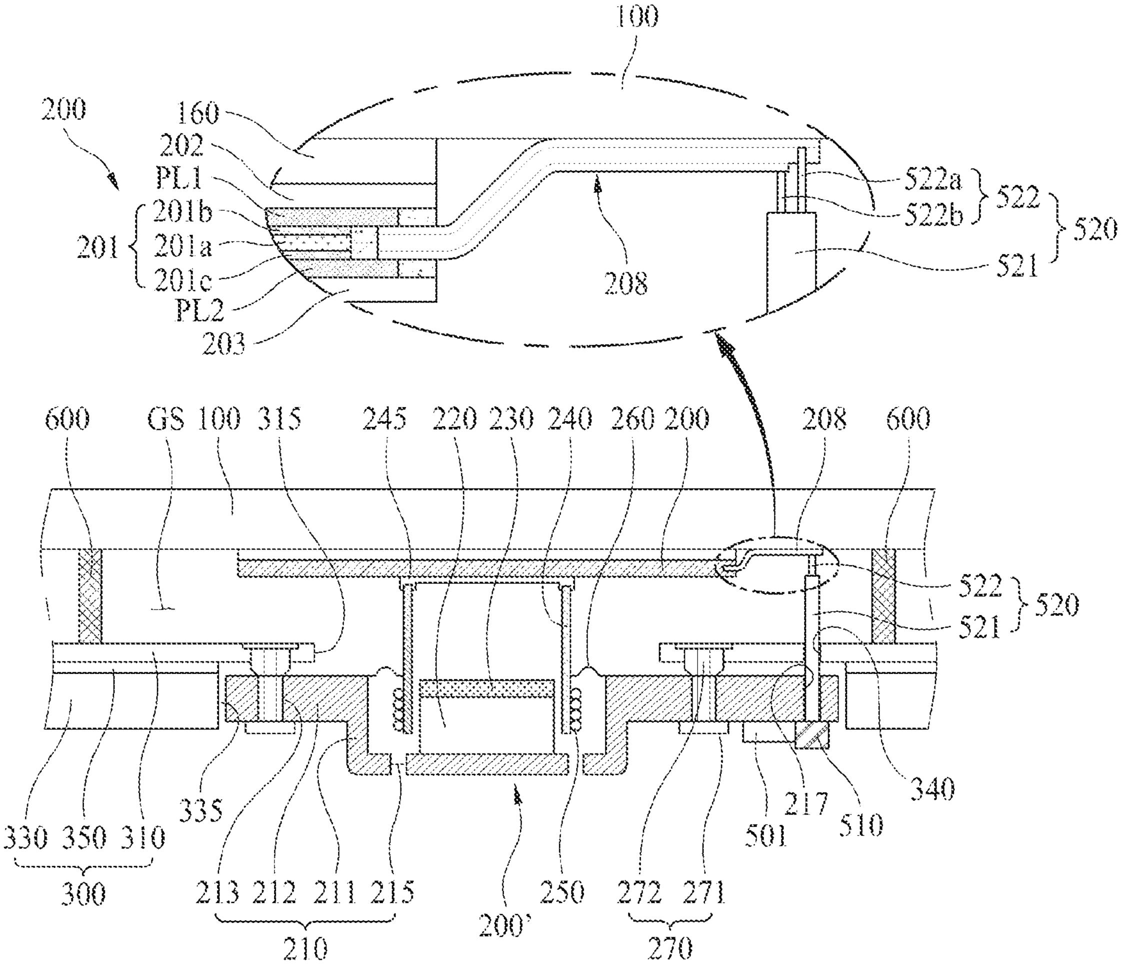
FIGS. 13 and 14 illustrate another embodiment of the vibration apparatus illustrated in FIG. 12 according to an embodiment of the present disclosure.
Figure 14:
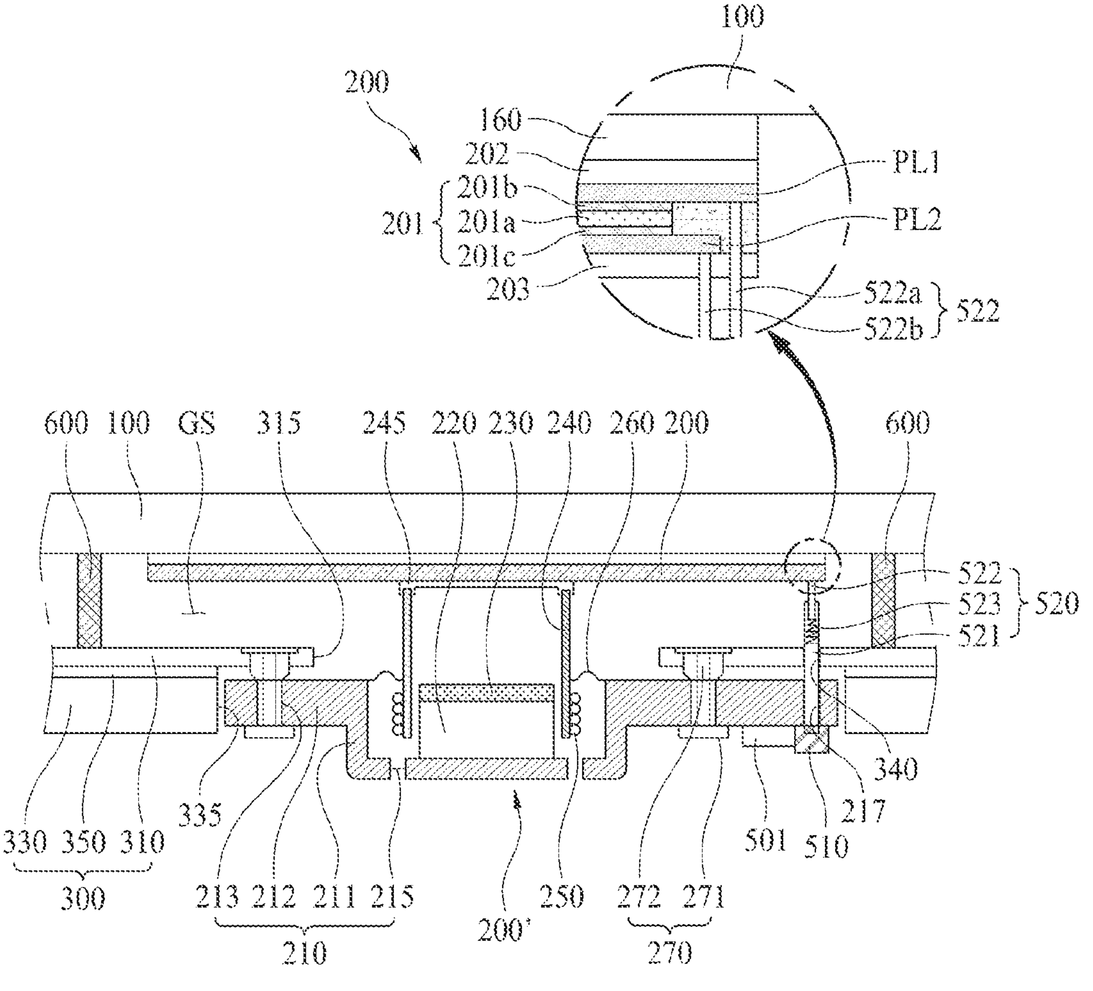

FIGS. 13 and 14 illustrate another embodiment of the vibration apparatus illustrated in FIG. 12. FIGS. 13 and 14 illustrate an embodiment implemented by modifying configurations of the control board and the signal connection member illustrated in FIG. 12. Therefore, repeated descriptions of the same elements other than modified configurations of a control board and a signal connection member and relevant elements are omitted or will be briefly described below.

Referring to FIG. 13, in vibration apparatuses 200 and 200' according to another embodiment of the present disclosure, a control board 501 which controls a first vibration apparatus 200 and a second vibration apparatus 200' may be disposed at a rear surface of the second vibration apparatus 200'. Also, the vibration apparatuses 200 and 200' may further include a signal connection member 520 which is connected with a signal connector 510 of the control board 501 and the first vibration apparatus 200.

According to another embodiment of the present disclosure, the control board 501 may be connected with the first vibration apparatus 200 and the second vibration apparatus 200' through the same signal path. The control board 501 may apply the same vibration driving signal to the first vibration apparatus 200 and the second vibration apparatus 200' through the same signal path, and thus, the first vibration apparatus 200 and the second vibration apparatus 200' may be simultaneously driven or vibration-driven.

The control board 501 may include a signal connector 510 which applies a vibration driving signal to the first vibration apparatus 200 and the second vibration apparatus 200'. The signal connector 510 may be connected with the first vibration apparatus 200 and the second vibration apparatus 200' in common.

The supporting member 300 according to another embodiment of the present disclosure, as illustrated in FIG. 13, may include a first contact hole 340 through which the signal connection member 520 connecting the first vibration apparatus 200 with the signal connector 510 of the control board 501 passes. The second vibration apparatus 200' may include a second contact hole 217 which overlaps the first contact hole 340 of the supporting member 300. The first vibration apparatus 200 may be electrically connected with the signal connector 510 of the control board 501 through the signal connection member 520 passing through the first contact hole 340 of the supporting member 300 and the second contact hole 217 of the second vibration apparatus 200'. That is, the signal connection member 520 includes a portion that is disposed in the first contact hole 340 and another portion that is disposed in the second contact hole 217.

The signal connection member 520 may include a body portion 521 and a contact portion 522. The body portion 521 of the signal connection member 520 may be connected with the signal connector 510, and the contact portion 522 of the signal connection member 520 may be connected with the first vibration apparatus 200. For example, the signal connection member 520 may be configured with a probe pin. For example, the first vibration apparatus 200 may include a signal connection member 520 which is connected with each of first and second power supply lines PL1 and PL2 or first and second electrode layers 201*b* and 201*c* thereof. Also, the signal connection member 520 may be connected with a signal contact pad 208 of the first vibration apparatus 200.

The signal contact pad 208, as illustrated in FIG. 13, may be inserted or accommodated into the first vibration apparatus 200 and may be connected with each of the first and second power supply lines PL1 and PL2 of the first vibration apparatus 200. The signal contact pad 208 may be disposed between the first and second power supply lines PL1 and PL2 of the first vibration apparatus 200. For example, one surface (or an upper surface) of the signal contact pad 208 may contact the first power supply line PL1 connected with the first electrode layer 201*b*, and the other surface (or a lower surface) of the signal contact pad 208 may contact the second power supply line PL2 connected with the second electrode layer 201*c*.

In the signal connection member 520, as illustrated in FIG. 13, the contact portion 522 of the signal connection member 520 may include a first contact portion 522*a* and a second contact portion 522*b*. The signal connection member 520 may contact and be electrically connected with the signal contact pad 208 connected with the first vibration apparatus 200. For example, the first contact portion 522*a* may contact one surface (or an upper surface) of the signal contact pad 208 connected with the first electrode layer 201*b*, and the second contact portion 522*b* may contact the other surface (or a lower surface) of the signal contact pad 208 connected with the second electrode layer 201*c*.

Referring to FIG. 14, in vibration apparatuses 200 and 200' according to another embodiment of the present disclosure, a control board 501 which controls a first vibration apparatus 200 and a second vibration apparatus 200' may be disposed at a rear surface of the second vibration apparatus 200'. Also, the vibration apparatuses 200 and 200' may further include a signal connection member 520 which is connected with a signal connector 510 of the control board 501 and the first vibration apparatus 200.

According to another embodiment of the present disclosure, the control board 501 may be connected with the first vibration apparatus 200 and the second vibration apparatus 200' through the same signal path. The control board 501 may include a signal connector 510 which applies a vibration driving signal to the first vibration apparatus 200 and the second vibration apparatus 200'. The signal connector 510 may be connected with the first vibration apparatus 200 and the second vibration apparatus 200' in common. The control board 501 may be electrically connected with the first vibration apparatus 200 and the second vibration apparatus 200' through a signal connection member 520 connected with the signal connector 510. For example, the signal connection member 520 may include at least one of a signal cable, a probe pin, and a pogo pin.

The supporting member 300 according to another embodiment of the present disclosure, as illustrated in FIG. 14, may include a first contact hole 340 through which the signal connection member 520 connecting the first vibration apparatus 200 with the signal connector 510 of the control board 501 passes. Also, the second vibration apparatus 200' may include a second contact hole 217 which overlaps the first contact hole 340 of the supporting member 300. The first contact hole 340 of the supporting member 300 and the second contact hole 217 of the second vibration apparatus 200' may be provided to overlap at least a portion of the first vibration apparatus 200. The first vibration apparatus 200 may be electrically connected with the signal connector 510 of the control board 501 through the signal connection member 520 passing through the first contact hole 340 of the supporting member 300 and the second contact hole 217 of the second vibration apparatus 200'. That is, the signal connection member 520 includes a portion that is disposed in the first contact hole 340 and another portion that is disposed in the second contact hole 217.

The signal connection member 520 may include a body portion 521, a contact portion 522, and an elastic portion 523. For example, the elastic portion 523 may be accommodated into an inner portion of the body portion 521, and the contact portion 522 may contact one end of the elastic portion 523. The contact portion 522 of the signal connection member 520 may be configured so that a certain portion thereof is moved by expansion and/or contraction of the elastic portion 523. The body portion 521 of the signal connection member 520 may be connected with the signal connector 510, and the contact portion 522 of the signal connection member 520 where a certain portion thereof is movable by the elastic portion 523 may be connected with the first vibration apparatus 200. For example, the signal connection member 520 may be configured as a pogo pin. For example, the signal connection member 520 may directly contact each of first and second power supply lines PL1 and PL2 or first and second electrode layers 201*b* and 201*c* of the first vibration apparatus 200.

As illustrated in FIG. 14, a portion of each of the first and second power supply lines PL1 and PL2 of the first vibration apparatus 200 may be provided to be exposed at the outside. The signal connection member 520 may be connected with each of the first and second power supply lines PL1 and PL2 through an exposed portion of each of the first and second power supply lines PL1 and PL2. For example, the first vibration apparatus 200 may be configured so that a portion of a lower surface of each of the first and second power supply lines PL1 and PL2 is exposed.

In the signal connection member 520, as illustrated in FIG. 14, the contact portion 522 of the signal connection member 520 may include a first contact portion 522*a* and a second contact portion 522*b*. The signal connection member 520 may contact and be electrically connected with each of the first and second power supply lines PL1 and PL2 where a portion thereof is exposed, in the first vibration apparatus 200. For example, the first contact portion 522*a* may contact an exposed lower surface of the first power supply line PL1 connected with the first electrode layer 201*b*, and the second contact portion 522*b* may contact an exposed lower surface of the second power supply line PL2 connected with the second electrode layer 201*c*.

The apparatus according to an embodiment of the present disclosure may be applied to a vibration generating apparatus and/or a sound generating apparatus. The apparatus according to an embodiment of the present disclosure may be applied to mobile devices, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, e-books, portable multimedia players (PMPs), personal digital assistants (PDAs), MP3 players, mobile medical apparatuses, desktop personal computers (PCs), laptop PCs, netbook computers, workstations, navigation devices, automotive navigation devices, automotive display apparatuses, automotive apparatuses, cinema display apparatuses, televisions (TVs), wall paper display apparatuses, signage apparatuses, game machines, notebook computers, monitors, cameras, camcorders, home appliances, etc.

An apparatus according to various embodiments of the present disclosure will be described below.

An apparatus according to various embodiments of the present disclosure may include a vibration member, a supporting member at a rear surface of the vibration member, a first vibration apparatus connected with the rear surface of the vibration member, and a second vibration apparatus provided between the vibration member and the supporting member to overlap the first vibration apparatus.

According to various embodiments of the present disclosure, the first vibration apparatus may be configured to output a sound of a first pitched sound band, and the second vibration apparatus may be configured to output a sound of a second pitched sound band which differs from the first pitched sound band.

According to various embodiments of the present disclosure, the first pitched sound band may include a high pitched sound band, and the second pitched sound band may include a low pitched sound band.

According to various embodiments of the present disclosure, the first vibration apparatus may be between the vibration member and the second vibration apparatus.

According to various embodiments of the present disclosure, the first vibration apparatus may contact the rear surface of the vibration member.

According to various embodiments of the present disclosure, may further include a connection member between the vibration member and the first vibration apparatus.

According to various embodiments of the present disclosure, the second vibration apparatus may be apart from the rear surface of the vibration member.

According to various embodiments of the present disclosure, the second vibration apparatus may contact a rear surface of the first vibration apparatus.

According to various embodiments of the present disclosure, may further include a control board controlling the first vibration apparatus and the second vibration apparatus.

According to various embodiments of the present disclosure, the first vibration apparatus may be connected with the control board through a signal path which differs from the second vibration apparatus.

According to various embodiments of the present disclosure, the first vibration apparatus may be connected with the control board through the same signal path as the second vibration apparatus.

According to various embodiments of the present disclosure, the supporting member may include at least one first contact hole through which a signal connection member connecting the control board with the first vibration apparatus passes.

According to various embodiments of the present disclosure, the control board may be at a rear surface of the supporting member, and the first vibration apparatus may be connected with the control board through the signal connection member passing through the at least one first contact hole.

According to various embodiments of the present disclosure, the at least one first contact hole of the supporting member may not overlap the second vibration apparatus.

According to various embodiments of the present disclosure, the control board may be at a rear surface of the second vibration apparatus, and the second vibration apparatus may include at least one second contact hole overlapping the at least one first contact hole.

According to various embodiments of the present disclosure, the first vibration apparatus may be connected with the control board through the signal connection member passing through the at least one first contact hole and the at least one second contact hole.

According to various embodiments of the present disclosure, the control board may further include a signal connector applying a vibration signal to the first vibration apparatus and the second vibration apparatus.

According to various embodiments of the present disclosure, the signal connector may be connected with the first vibration apparatus and the second vibration apparatus in common.

According to various embodiments of the present disclosure, the signal connection member may include at least one of a signal cable, a probe pin, and a pogo pin.

According to various embodiments of the present disclosure, the first vibration apparatus may include a vibration layer, a first electrode layer at a first surface of the vibration layer, and a second electrode layer at a second surface, differing from the first surface, of the vibration layer.

According to various embodiments of the present disclosure, the vibration layer may include a plurality of inorganic material portions having a piezoelectric characteristic, and an organic material portion between the plurality of inorganic material portions.

According to various embodiments of the present disclosure, the vibration layer may include a piezoelectric material.

According to various embodiments of the present disclosure, may further include a control board controlling the first vibration apparatus and the second vibration apparatus, the first vibration apparatus may be electrically connected with a signal connection member connected with the control board.

According to various embodiments of the present disclosure, the signal connection member may directly contact the first electrode layer and the second electrode layer.

According to various embodiments of the present disclosure, the first vibration apparatus may further include a signal contact pad connected with the first electrode layer and the second electrode layer, and the signal connection member may contact the signal contact pad.

According to various embodiments of the present disclosure, the supporting member may include at least one first hole overlapping the first vibration apparatus, and the second vibration apparatus may be accommodated into the at least one first hole of the supporting member and is fixed to the supporting member.

According to various embodiments of the present disclosure, the second vibration apparatus may further include a frame connected with the supporting member, a magnet on the frame, a bobbin around the magnet, and a coil around the bobbin.

According to various embodiments of the present disclosure, the frame may include a first frame into which the magnet, the bobbin, and the coil are accommodated, and a second frame fixed to the supporting member, the second frame protruding from an edge of the first frame.

According to various embodiments of the present disclosure, the second vibration apparatus may further include a frame cover covering a rear surface of the frame.

According to various embodiments of the present disclosure, may further include a heat dissipation member between the frame cover and a rear surface of the first frame.

According to various embodiments of the present disclosure, the second vibration apparatus may further include a plurality of second holes overlapping the at least one first hole.

According to various embodiments of the present disclosure, the plurality of second holes may be disposed in the first frame and overlap the bobbin and the coil.

According to various embodiments of the present disclosure, may further include a control board including a signal connector applying a vibration signal to the first vibration apparatus and the second vibration apparatus, the second vibration apparatus may be electrically connected with the signal connector.

According to various embodiments of the present disclosure, the control board may be at a rear surface of the second frame, the supporting member may include at least one first contact hole overlapping the signal connector, and the second frame may include at least one second contact hole overlapping the at least one first contact hole.

According to various embodiments of the present disclosure, the first vibration apparatus may be electrically connected with the signal connector through a signal connection member passing through the at least one first contact hole and the at least one second contact hole.

According to various embodiments of the present disclosure, the vibration member may be one or more materials of metal, plastic, fiber, leather, wood, cloth, rubber, carbon, glass, and paper.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure. It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An apparatus comprising:

a vibration member;

a supporting member on a rear surface of the vibration member and including at least one first contact hole;

a first vibration apparatus connected with the rear surface of the vibration member and between the supporting member and the vibration member, the first vibration apparatus configured to vibrate such that the vibration member vibrates;

a second vibration apparatus between the first vibration apparatus and the supporting member, the second vibration apparatus overlapping the first vibration apparatus and including at least one second contact hole that overlaps the at least one first contact hole, and the second vibration apparatus configured to vibrate such that the vibration member vibrates;

a control board at a rear surface of the second vibration apparatus and configured to control a vibration of the first vibration apparatus and a vibration of the second vibration apparatus; and a signal connection member including a portion disposed in the at least one first contact hole and another portion disposed in the at least one second contact hole, wherein the first vibration apparatus is connected with the control board via the signal connection member passing through the at least one first contact hole and the at least one second contact hole.

2. The apparatus of claim 1, wherein the first vibration apparatus is configured to output a sound of a first pitched sound band, and the second vibration apparatus is configured to output a sound of a second pitched sound band that is different from the first pitched sound band.

3. The apparatus of claim 2, wherein the first pitched sound band comprises a high pitched sound band, and the second pitched sound band comprises a low pitched sound band that is lower than the high pitched sound band.

4. The apparatus of claim 1, wherein the first vibration apparatus is between the vibration member and the second vibration apparatus.

5. The apparatus of claim 1, wherein the first vibration apparatus contacts the rear surface of the vibration member.

6. The apparatus of claim 1, further comprising:

a connection member between the vibration member and the first vibration apparatus, the connection member connecting together the vibration member and the first vibration apparatus.

7. The apparatus of claim 1, wherein the second vibration apparatus is spaced apart from the rear surface of the vibration member.

8. The apparatus of claim 1, wherein the second vibration apparatus is in contact with a rear surface of the first vibration apparatus.

9. The apparatus of claim 1, wherein the first vibration apparatus is connected with the control board through a first signal path and the second vibration apparatus is connected with the control board through a second signal path that is different from the first signal path.

10. The apparatus of claim 1, wherein the first vibration apparatus is connected to the control board and the second vibration apparatus is connected to the control board through a same signal path.

11. The apparatus of claim 1, wherein the control board further comprises a signal connector configured to apply a vibration signal to the first vibration apparatus and the second vibration apparatus.

12. The apparatus of claim 11, wherein the signal connector is connected with the first vibration apparatus and the second vibration apparatus.

13. The apparatus of claim 1, wherein the signal connection member comprises at least one of a signal cable, a probe pin, or a pogo pin.

14. The apparatus of claim 1, wherein the first vibration apparatus comprises:

a vibration layer;

a first electrode layer at a first surface of the vibration layer; and a second electrode layer at a second surface of the vibration layer that is opposite the first surface of the vibration layer such that the vibration layer is between the first electrode layer and the second electrode layer.

15. The apparatus of claim 14, wherein the vibration layer comprises:

a plurality of inorganic material portions having a piezoelectric characteristic; and an organic material portion between the plurality of inorganic material portions.

16. The apparatus of claim 14, wherein the vibration layer comprises a piezoelectric material.

17. The apparatus of claim 14, wherein the signal connection member directly contacts the first electrode layer and the second electrode layer.

18. The apparatus of claim 14, wherein the first vibration apparatus further comprises a signal contact pad connected with the first electrode layer and the second electrode layer, and the signal connection member contacts the signal contact pad.

19. The apparatus of claim 1, wherein the supporting member comprises at least one first hole overlapping the first vibration apparatus, and the second vibration apparatus is in the at least one first hole of the supporting member and is connected to the supporting member.

20. The apparatus of claim 19, wherein the second vibration apparatus further comprises:

a frame connected with the supporting member;

a magnet on the frame;

a bobbin around the magnet; and a coil wound around the bobbin.

21. The apparatus of claim 20, wherein the frame comprises:

a first frame; and a second frame connected to the supporting member, the second frame protruding from an edge of the first frame, wherein the magnet, the bobbin, and the coil are on the first frame.

22. The apparatus of claim 21, wherein the second vibration apparatus further comprises a frame cover covering a rear surface of the first frame and a rear surface of the second frame.

23. The apparatus of claim 22, further comprising:

a heat dissipation member between the frame cover and the rear surface of the first frame.

24. The apparatus of claim 21, wherein the second vibration apparatus further comprises a plurality of second holes overlapping the at least one first hole.

25. The apparatus of claim 24, wherein the plurality of second holes are in the first frame and overlap the bobbin and the coil.

26. The apparatus of claim 21, wherein the control board includes a signal connector, the signal connector applying a vibration signal generated by the control board to the first vibration apparatus and the second vibration apparatus, wherein the second vibration apparatus is electrically connected to the signal connector.

27. The apparatus of claim 26, wherein the control board is at a rear surface of the second frame, the at least one first contact hole overlaps the signal connector, and the at least one second contact hole is disposed in the second frame to overlap the at least one first contact hole.

28. The apparatus of claim 27, wherein the first vibration apparatus is electrically connected to the signal connector through the signal connection member.

29. The apparatus of claim 1, wherein the vibration member comprises one or more materials of metal, plastic, fiber, leather, wood, cloth, rubber, carbon, glass, or paper.

30. A display apparatus comprising:

a display panel including a front surface and a rear surface that is opposite the front surface;

a first type of vibration apparatus on the rear surface of the display panel, the first type of vibration apparatus configured to vibrate;

a second type of vibration apparatus that is different from the first type of vibration apparatus and overlapping the first type of vibration apparatus such that the first type of vibration apparatus is between the display panel and the second type of vibration apparatus, the second type of vibration apparatus configured to vibrate;

a supporting member on the rear surface of the display panel such that the first type of vibration apparatus is between the display panel and the supporting member, the supporting member including at least one first contact hole; and a control board at a rear surface of the second type of vibration apparatus and configured to control a vibration of the first type of vibration apparatus and a vibration of the second type of vibration apparatus, wherein the display panel is configured to emit sound responsive to the first type of vibration apparatus vibrating or the second type of vibration apparatus vibrating, wherein the second type of vibration apparatus includes at least one second contact hole that overlaps the at least one first contact hole, and wherein the first type of vibration apparatus is connected with the control board via a signal connection member having a portion disposed in the at least one first contact hole and another portion disposed in the at least one second contact hole.

31. The display apparatus of claim 30, wherein the first type of vibration apparatus comprises a piezoelectric type vibration apparatus and the second type of vibration apparatus comprises a coil type vibration apparatus.

32. The display apparatus of claim 30, wherein the display apparatus is configured to emit sound having a first pitch responsive to vibration of the first type of vibration apparatus and is configured to emit sound having a second pitch that is lower than the first pitch responsive to vibration of the second type of vibration apparatus.

* * * * *